(12) United States Patent
Yoneda

(10) Patent No.: US 9,953,793 B2
(45) Date of Patent: *Apr. 24, 2018

(54) SHORT-CIRCUIT ELEMENT AND A CIRCUIT USING THE SAME

(71) Applicant: DEXERIALS CORPORATION, Tokyo (JP)

(72) Inventor: Yoshihiro Yoneda, Tochigi (JP)

(73) Assignee: DEXERIALS CORPORATION, Tokyo (JP)

(*) Notice: Subject to any disclaimer, the term of this patent is extended or adjusted under 35 U.S.C. 154(b) by 408 days.

This patent is subject to a terminal disclaimer.

(21) Appl. No.: 14/819,328

(22) Filed: Aug. 5, 2015

(65) Prior Publication Data

US 2016/0005562 A1 Jan. 7, 2016

Related U.S. Application Data

(63) Continuation of application No. PCT/JP2014/052634, filed on Feb. 5, 2014.

(30) Foreign Application Priority Data

Feb. 5, 2013 (JP) .................................. 2013-020756
Feb. 8, 2013 (JP) .................................. 2013-023171
(Continued)

(51) Int. Cl.
*H01H 85/00* (2006.01)
*H01H 85/02* (2006.01)
(Continued)

(52) U.S. Cl.
CPC ........ *H01H 85/055* (2013.01); *H01H 37/761* (2013.01); *H01H 37/767* (2013.01);
(Continued)

(58) Field of Classification Search
CPC .... H01H 37/761; H01H 37/767; H01H 61/02; H01H 85/0056; H01H 85/0241;
(Continued)

(56) References Cited

U.S. PATENT DOCUMENTS 6,275,005 B1 * 8/2001 Stadnick ................. H01M 2/34
257/665
6,420,852 B1    7/2002 Sato

FOREIGN PATENT DOCUMENTS

| JP | 2000-133318 A | 5/2000 |
|---|---|---|
| JP | 2007-012381 A | 1/2007 |
| JP | 2010-003665 A | 1/2010 |

OTHER PUBLICATIONS

Mar. 4, 2014 Search Report issued in International Application No. PCT/JP2014/052634.
(Continued)

*Primary Examiner* — Thienvu Tran
*Assistant Examiner* — Kevin J Comber
(74) *Attorney, Agent, or Firm* — Oliff PLC

(57) ABSTRACT

A bypass avoiding only abnormal cells or abnormal electronic components in an electronic appliance having a plurality of battery cells or electronic components is formed to decrease resistance while keeping functionality. An insulating substrate 2; a heat-generating resistor 3 arranged on the insulating substrate 2; a first and a second electrodes 4, 5 arranged adjacently to each other on the insulating substrate 2; a third electrode 6 arranged adjacently to the first electrode 4 and electrically connected to the heat-generating resistor; and a first meltable conductor 8 arranged between the first and third electrodes 4, 6 to constitute a current path capable of being blown by a heat generated by the heat-generating resistor 3 are provided. The first meltable conductor 8 melted by heat from the heat-generating resistor 3
(Continued)

gathers on the first and second electrodes 4, 5 to short-circuit them.

95 Claims, 20 Drawing Sheets

(30) Foreign Application Priority Data

| Feb. 12, 2013 | (JP) | ................................. 2013-024643 |
|---|---|---|
| Jun. 13, 2013 | (JP) | ................................. 2013-125077 |
| Jun. 13, 2013 | (JP) | ................................. 2013-125078 |
| Jun. 13, 2013 | (JP) | ................................. 2013-125079 |

(51) Int. Cl.

| *H01M 2/34* | (2006.01) |
|---|---|
| *H01H 85/055* | (2006.01) |
| *H01H 37/76* | (2006.01) |
| *H01H 61/02* | (2006.01) |
| *H01M 10/42* | (2006.01) |
| *H01M 10/44* | (2006.01) |
| *H01M 10/48* | (2006.01) |

(52) U.S. Cl.
CPC ........ *H01H 61/02* (2013.01); *H01H 85/0056* (2013.01); *H01H 85/0241* (2013.01); *H01M 2/348* (2013.01); *H01M 10/425* (2013.01); *H01M 10/441* (2013.01); *H01M 10/482* (2013.01); *H01H 2231/026* (2013.01); *H01M 2200/10* (2013.01); *H01M 2200/103* (2013.01); *H01M 2200/108* (2013.01)

(58) Field of Classification Search
CPC .......... H01H 85/055; H01H 2231/026; H01M 2/348; H01M 10/425; H01M 10/441; H01M 10/482; H01M 2200/10; H01M 2200/103; H01M 2200/108
USPC .......................................................... 361/54
See application file for complete search history.

(56) References Cited

OTHER PUBLICATIONS

Nov. 20, 2017 Office Action issued in U.S. Appl. No. 14/819,061.
Nov. 17, 2017 Notice of Allowance issued in U.S. Appl. No. 14/818,862.

* cited by examiner

US 9,953,793 B2

SHORT-CIRCUIT ELEMENT AND A CIRCUIT USING THE SAME

TECHNICAL FIELD

This invention relates to a short-circuit element and a circuit using the same having a heat-generating resistor and a fuse element formed on a substrate to bypass only abnormal components within an electronic appliance.

BACKGROUND ART

Secondary batteries are often provided to users in the form of rechargeable battery packs which can be repeatedly used. In particular, in order to protect users and electronic appliances, lithium ion secondary batteries having a high volumetric energy density typically include several protective circuits incorporated in battery packs for over-charging protection and over-discharging protection to interrupt the output of the battery pack under predetermined conditions.

Some of these protective elements use an FET switch incorporated in a battery pack to turn ON/OFF the output, for over-charging protection or over-discharging protection of the battery pack. However, even in the cases of the FET switch being short-circuited and damaged for some reason, a large current momentarily flows caused by a surge such as a lightning surge, and an abnormally decreased output voltage or an excessively high voltage occurs in an aged battery cell, the battery pack or the electronic appliance should prevent accidents including fire, among others. For this reason, a protective element is used having a fuse which interrupts a current path in accordance with an external signal so as to safely interrupt the output of the battery cell under these possible abnormalities.

PLT 1 discloses a protective element of a protective circuit for a lithium ion secondary battery in which a meltable conductor is connected as a part of a current path from a first electrode, through a conductive layer connected to a heat-generating element, to a second electrode, and this meltable conductor in the current path is blown by self-heating due to an overcurrent or by a heat-generating element provided in the protective element. In this protective element, the current path is interrupted by gathering of the fused meltable conductor in liquid phase onto the conducting layer connected to the heat-generating element.

Furthermore, there has been proposed an LED illumination apparatus in which short-circuit elements are connected to serially connected LED elements in parallel, the short-circuit elements are short-circuited by a predetermined abnormal voltage and normal LEDs emit light (PLT 2). In the short-circuit element of PLT 2, several elements sandwiching an insulating barrier layer having a predetermined film thickness are connected in series.

PRIOR ART LITERATURE

Patent Literatures

PLT 1: Japanese Unexamined Patent Application Publication No. 2010-003665
PLT 2: Japanese Unexamined Patent Application Publication No. 2007-12381

SUMMARY OF THE INVENTION

Problem to be Solved by the Invention

In recent years, hybrid electric vehicles (HEVs) and electric vehicles (EVs) using batteries and motors have become widely used. Lithium ion secondary batteries are employed as power sources for HEVs and EVs because of their advantages in energy density and output properties. These automotive applications require a high voltage and a large current. For this reason, many dedicated cells capable of enduring a high voltage and a large current are under development; however, in many cases, a plurality of general-purpose battery cells are provided and connected in series or in parallel to achieve necessary voltage and current.

In a vehicle such as an automobile moving at a high speed, there are cases in which a rapid decrease in driving power or a sudden stop of the vehicle is dangerous; therefore, a battery management appropriate for abnormal situations is required. For example, when a battery system abnormality occurs during vehicle operation, driving power to move to a repair shop or safe location and power to a hazard lamp or air conditioner is preferably supplied in view of risk avoidance.

Unfortunately, the battery pack of PLT 1 in which several battery cells are connected in series and the protective element is provided only on a charging/discharging path, when an abnormality occurs in a part of the battery cell activates the protective element, the entire charging/discharging path of the battery pack is interrupted such that the battery pack can no longer power.

On the other hand, in the short-circuit element described in PLT 2, the current/voltage characteristics curve exhibits a high resistance of 17 k$\Omega$ upon voltage application of 10 V; it is therefore desired to further decrease the resistance value in order to efficiently bypass an LED element in open state.

An object of the present invention therefore is to provide a short-circuit element and a circuit using the same capable of effectively utilize normal cells by forming a bypass path avoiding only abnormal cells in a battery pack having several cells.

Solution to Problem

To solve the aforementioned problem, an aspect of the present invention provides a short-circuit element comprising: an insulating substrate; a heat-generating resistor arranged on the insulating substrate; a first and a second electrodes arranged adjacently to each other on the insulating substrate; a third electrode arranged adjacently to the first electrode on the insulating substrate and electrically connected to the heat-generating resistor; and a first meltable conductor arranged between the first and third electrodes to constitute a current path capable of being blown by a heat generated by the heat-generating resistor, wherein the first meltable conductor is melted by the heat from the heat-generating resistor and gathers on the first and second electrodes to short-circuit the first and second electrodes.

Another aspect of the present invention provides a short-circuit element circuit comprising: a fuse; a heat-generating resistor connected to one terminal of the fuse; and a switch connected to another terminal of the fuse to which the heat-generating resistor is not connected, wherein the switch is short-circuited in conjunction with blowout of the fuse.

Another aspect of the present invention provides a compensation circuit comprising: a short-circuit element having a fuse, a heat-generating resistor connected to one terminal of the fuse, and a switch connected to another terminal of the fuse to which the heat-generating resistor is not connected, the switch being short-circuited in conjunction with blowout of the fuse; and an electronic component, wherein both terminals of the switch are connected to the electronic component in parallel, wherein an open terminal of the heat-generating resistor is connected to the terminal of the switch to which the fuse is not connected, and wherein, in an abnormal situation of the electronic component, the fuse melts to short-circuit the switch so as to form a bypass current path bypassing the electronic component.

Another aspect of the present invention provides a compensation circuit comprising: a short-circuit element having a fuse, a heat-generating resistor connected to one terminal of the fuse, and a switch connected to another terminal of the fuse to which the heat-generating resistor is not connected, the switch being short-circuited in conjunction with melting of the fuse; and an electronic component; a protective element connected in a current path of the electronic component which interrupts current flowing to the electronic component in the case of an electric signal; a protective component which detects an abnormality of the electronic component and outputs an abnormal signal; and a controlling element which operates in accordance with the abnormal signal from the protective component, wherein both terminals of the electronic component and the protective element are connected to both terminals of the switch in parallel, wherein an open terminal of the heat-generating resistor and an input terminal for the electric signal of the controlling element are connected to the protective element, and wherein, in an abnormal situation of the electronic component, the controlling element operates in accordance with an abnormal signal from the protective component to disconnect the current path of the electronic component with the protective element and to short-circuit the switch in conjunction with melting of the fuse to form a bypass current path.

Another aspect of the present invention provides a short-circuit element circuit comprising: a fuse; a heat-generating resistor connected to one terminal of the fuse; a switch connected to another terminal of the fuse to which the heat-generating resistor is not connected; and a protective resistor connected to at least one terminal of the switch, wherein the switch is short-circuited in conjunction with blowout of the fuse.

Another aspect of the present invention provides a compensation circuit comprising: a short-circuit element having a fuse, a heat-generating resistor connected to one terminal of the fuse, a switch connected to another terminal of the fuse to which the heat-generating resistor is not connected, and a protective resistor connected to at least one terminal of the switch to which the fuse is not connected, the switch being short-circuited in conjunction with melting of the fuse; and an electronic component, wherein the terminal connected to the switch and the fuse and an open terminal of the protective resistor, are connected to the electronic component in parallel, wherein the heat-generating resistor is connected to the protective resistor, and wherein, in an abnormal situation of the electronic component, the fuse melts to turn on the switch so as to form a bypass current path.

Another aspect of the present invention provides a compensation circuit comprising: a short-circuit element having a fuse, a heat-generating resistor connected to one terminal of the fuse, a switch connected to another terminal of the fuse to which the heat-generating resistor is not connected, and a protective resistor connected to at least one terminal of the switch to which the fuse is not connected, the switch being short-circuited in conjunction with melting of the fuse; an electronic component, a protective element connected in a current path of the electronic component, which disconnects the electrical connection to the electronic component in the case of an electronic signal; a protective component which detects an abnormality of the electronic component and outputs an abnormal signal; and a controlling element which operates in accordance with the abnormal signal from the protective component, wherein both terminals of the electronic component and the protective element are connected to the terminal of the switch connected to the fuse and the protective resistor in parallel, wherein an open terminal of the heat-generating resistor and an input terminal for the electric signal of the controlling element are connected to the protective element, and wherein, in an abnormal situation of the electronic component, the controlling element operates in accordance with an abnormal signal from the protective component to disconnect the current path of the electronic component with the protective element and to short-circuit the switch in conjunction with melting of the fuse to form a bypass current path.

Another aspect of the present invention provides a mounting member in which a short-circuit element is mounted onto a mounting target, the short-circuit element comprising: an insulating substrate; a heat-generating resistor arranged on the insulating substrate; a first and a second electrodes arranged adjacently to each other on the insulating substrate; a third electrode arranged adjacently to the first electrode on the insulating substrate and electrically connected to the heat-generating resistor; a first meltable conductor arranged between the first and third electrodes to constitute a current path capable of being blown by a heat generated by the heat-generating resistor; and a first external connecting electrode continuous with the first electrode formed on the same surface as the first and second electrodes, and a second external connecting electrode continuous with the second electrode, wherein the first electrode is connected to the mounting target via the first external connecting terminal connected to the first external connecting electrode, and the second electrode is connected to the mounting target via the second external connecting terminal connected to the second external connecting electrode, and wherein a combined resistance of the first external connecting terminal and the second external connecting terminal is lower than a conduction resistance between the first and second external connecting electrodes when the first meltable conductor is melted by the heat from the heat-generating resistor and gather on the first and second electrodes to short-circuit the first and second electrodes.

Advantageous Effects of Invention

The present invention can form a new bypass current path by short-circuiting the normally-isolated first and second electrodes by a meltable conductor gathered on the first and second electrodes melted by heat from a heat-generating resistor.

DESCRIPTION OF THE EMBODIMENTS

Figure 1A:
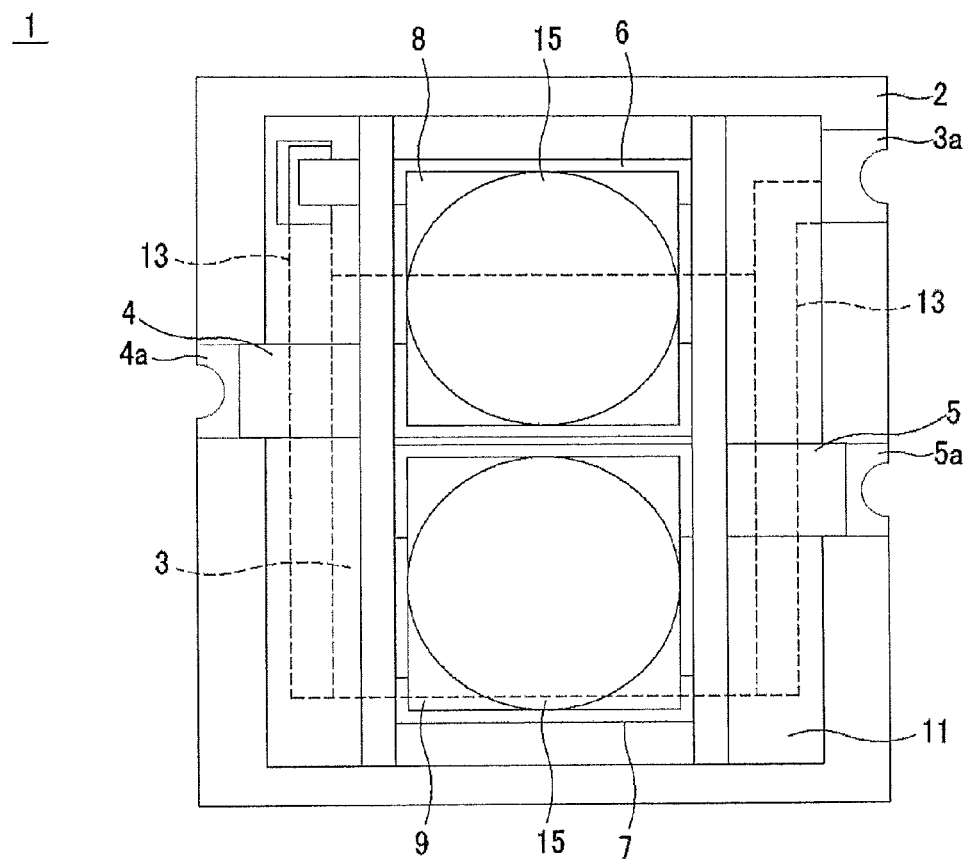
FIG. 1 (A) is a plan view of a short-circuit element according to the present invention and FIG. 1 (B) is a cross-sectional view of the same.

Embodiments of short-circuit elements according to the present invention and circuits using the same will now be more particularly described with reference to the accompanying drawings. It should be noted that the present invention is not limited to the embodiments described below and various modifications can be added to the embodiment without departing from the scope of the present invention. The features shown in the drawings are illustrated schematically and are not intended to be drawn to scale. Actual dimensions should be determined in consideration of the following description. Moreover, those skilled in the art will appreciate that dimensional relations and proportions may be different among the drawings in some parts.

First Embodiment

Short-Circuit Element

Figure 1B:
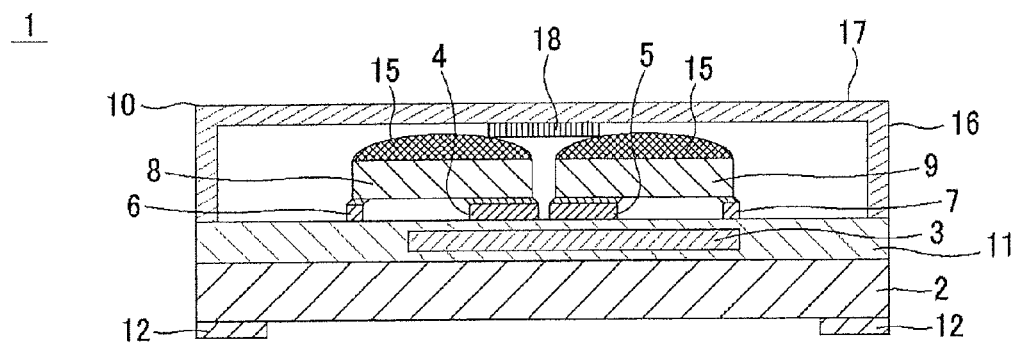

A first embodiment of the present invention will be explained below. FIG. 1(A) is a plan view of short-circuit element 1 and FIG. 1(B) is a cross-sectional view of the short-circuit element 1. The short-circuit element 1 comprises: an insulating substrate 2; a heat-generating resistor 3 arranged on the insulating substrate 2; a first electrode 4 and a second electrode 5 arranged adjacently to each other on the insulating substrate 2; a third electrode 6 arranged adjacently to the first electrode 4 and electrically connected to the heat-generating resistor 3; a fourth electrode 7 arranged adjacently to the second electrode 5; a first meltable conductor 8 arranged between the first and third electrodes 4 and 6 to constitute a current path capable of being blown by a heat generated by the heat-generating resistor 3, a second meltable conductor 9 arranged between the second and fourth electrodes 5 and 7 to constitute a current path capable of being blown by a heat generated by the heat-generating resistor 3. The short-circuit element 1 also includes a covering member 10 attached to the insulating substrate 2 for internal protection.

The insulating substrate 2 is formed in an approximately rectangular shape by using an insulating material such as alumina, glass ceramics, mullite and zirconia. Other materials used for printed circuit boards such as glass epoxy substrate or phenol substrate may be used as the insulating substrate 2; in these cases, however, the temperature at which the fuses are blown should be considered. The insulating substrate 2 also includes an external terminal 12 formed on the back surface thereof.

The heat-generating resistor 3 is made of a conductive material such as W, Mo and Ru, which has a relatively high resistance and generates a heat when a current flows therethrough. A powdered alloy, composition or compound of these materials is mixed with resin binder to obtain a paste, which is screen-printed as a pattern on the insulating substrate 2 and baked to form the heat-generating resistor 3.

The heat-generating resistor 3 is covered with an insulating layer 11 on the insulating substrate 2. The insulating layer 11 is made of a glass, for example, and is provided for efficiently conducting the heat from the heat-generating resistor 3 to the first to fourth electrodes 4 to 7. The heat-generating resistor 3 heats the first to fourth electrodes 4 to 7 such that meltable conductor gathers easily.

The first to fourth electrodes 4, 5, 6 and 7 are formed on the insulating layer 11 covering the heat-generating resistor 3. The first electrode 4 is arranged adjacently to and insulated from the second electrode 5 on one side. The third electrode 6 is arranged adjacently to the other side of the first electrode 4. The first electrode 4 and the third electrode 6 are connected by a first meltable conductor 8 described below to form a current path of the short-circuit element 1. The first electrode 4 also includes a first electrode terminal 4*a* exposed on a side of the insulating substrate 2. The first electrode terminal 4*a* is connected to the external terminal 12 formed on the back surface of the insulating substrate 2 via a through hole.

The third electrode 6 is connected to the heat-generating resistor 3 via a heat-generating element extracting electrode 13 formed on the insulating substrate 2 or insulating layer 11. The heat-generating resistor 3 also includes a resistor terminal 3*a* exposed at a peripheral edge of the insulating substrate 2 via the heat-generating element extracting electrode 13. The resistor terminal 3*a* is connected to the external terminal 12 formed on the back surface of the insulating substrate 2 via a through hole.

The fourth electrode 7 is arranged adjacent to a side of the second electrode 5 which is opposite to the side facing the first electrode 4. The second electrode 5 and the fourth electrode 7 are connected to a second meltable conductor 9 described below. The second electrode 5 is also connected to a second electrode terminal 5a exposed at a side of the insulating substrate 2. The second electrode terminal 5a is connected to the external terminal 12 formed on the back surface of the insulating substrate 2 via a through hole.

The first to fourth electrodes 4, 5, 6 and 7 may be made of a common electrode material such as Cu and Ag; however, it is preferable that the surfaces of at least the first and second electrodes 4, 5 are coated by using a known plating process including Ni/Au plating, Ni/Pd plating and Ni/Pd/Au plating. This prevents oxidation of the first and second electrodes 4, 5, thus securely retaining the meltable conductor. In the case that the short-circuit element 1 is mounted by reflow, this process will prevent the solder connecting the first and second meltable conductors 8, 9 or low melting point metal constituting an outer layer of the first and second meltable conductors 8, 9 from melting and eroding the first and second electrodes 4, 5 (solder erosion) to disconnect them.

Meltable Conductor

The first and second meltable conductors 8, 9 are formed from a low melting point metal, such as Pb free solder consisting essentially of Sn, capable of being promptly melted by a heat of the heat-generating resistor 3.

The first and second meltable conductors 8, 9 may also contain a low melting point metal and a high melting point metal. The low melting point metal is preferably a solder including Pb free solder and the high melting point metal is preferably Ag, Cu or an alloy consisting essentially of these, among others. By containing the low melting point metal and high melting point metal, in the case that the short-circuit element 1 is mounted by reflow, even if the low melting point metal is melted by the reflow temperature exceeding the melting point of the low melting point metal layer, the first and second meltable conductors 8, 9 are not interrupted. These first and second meltable conductors 8, 9 may be formed by depositing a low melting point metal onto a high melting point metal by using a plating method or may be formed by using other laminating method or film-forming method. It should be noted that the first and second meltable conductors 8, 9 can be solder connected to the first and third electrodes 4 and 6 or to second and fourth electrode 5 and 7 by using a low melting point metal constituting the outer layer.

Alternatively, the first and second meltable conductors 8, 9 may have an inner low melting point metal layer and an outer high melting point metal layer. By using meltable conductors in which the entire surface of the inner low melting point metal layer is covered with the outer high melting point metal layer, even if the melting point of the low melting point metal is lower than reflow temperature, the low melting point metal of the inner layer will not leak out during reflow mounting. Furthermore, in the case of blowout, the low melting point metal of the inner layer melts and erodes the high melting point metal of the outer layer (solder erosion), thus achieving prompt blowout.

Alternatively, the first and second meltable conductors 8, 9 may have a coated structure in which the high melting point metal constitutes an inner layer and the low melting point metal constitutes an outer layer. By using meltable conductors in which the entire surface of the inner high melting point metal layer is covered with the outer low melting point metal layer, the meltable conductors can be connected to electrodes via the outer low melting point metal layer and, in the case of blowout, the low melting point metal melts and erodes the high melting point metal, thus achieving prompt blowout.

Alternatively, the first and second meltable conductors 8, 9 may have a laminated structure in which the low melting point metal and the high melting point metal are laminated. Alternatively, the first and second meltable conductors 8, 9 may have a multi-layered structure having four or more layers in which the low melting point metal and the high melting point metal are alternately laminated. Alternatively, the first and second meltable conductors 8, 9 may have a stripe-shaped structure in which the high melting point metal is laminated on a surface of the low melting point metal so as to form a stripe pattern. These structures can also reduce the time of erosion/melting of the high melting point metal by the low melting point metal.

Alternatively, the first and second meltable conductors 8, 9 may be constituted of a high melting point metal having a plurality of openings and a low melting point metal inserted in the openings. This structure increases the area of the high melting point metal layer contacting the melting low melting point metal layer and thus reduces the time in which the low melting point metal layer erodes the high melting point metal layer. It is, therefore, possible to promptly and surely blow the meltable conductor.

In addition, in the first and second meltable conductors 8, 9, the volume of the low melting point metal preferably is larger than that of the high melting point metal. By doing this, the first and the second meltable conductors 8, 9 can be quickly blown by effective erosion of the high melt point metal layer.

It should be noted that a flux 15 is applied on the first and second meltable conductors 8, 9 in order to prevent oxidation of the first and second meltable conductors 8, 9 and to improve wettability of the first and second meltable conductors 8, 9 during melting.

The insulating substrate 2 of the short-circuit element 1 is covered by a covering member 10 for internal protection. The covering member 10 includes a side wall 16 constituting a side surface of the short-circuit element 1 and a ceiling 17 constituting a top surface of the short-circuit element 1, the side wall 16 being connected onto the insulating substrate 2 to form a lid member which covers and closes the internal portion of the short-circuit element 1. Similarly to the insulating substrate 2, this covering member 10 is formed of an insulating material such as thermoplastic material, ceramics and glass epoxy substrate.

Additionally, the covering member 10 may have a covering member electrode 18 formed on the inner surface of the ceiling 17. The covering member electrode 18 is formed at a position overlapping the first and second electrodes 4, 5. This covering member electrode 18 can increase meltable conductor holding capacity because, when the first and second meltable conductors 8, 9 are melted by heat generated by the heat-generating resistor 3, the meltable conductors gathering on the first and second electrodes 4, 5 contact each other and wet-spread.

Short-Circuit Element Circuit

Figure 2B:
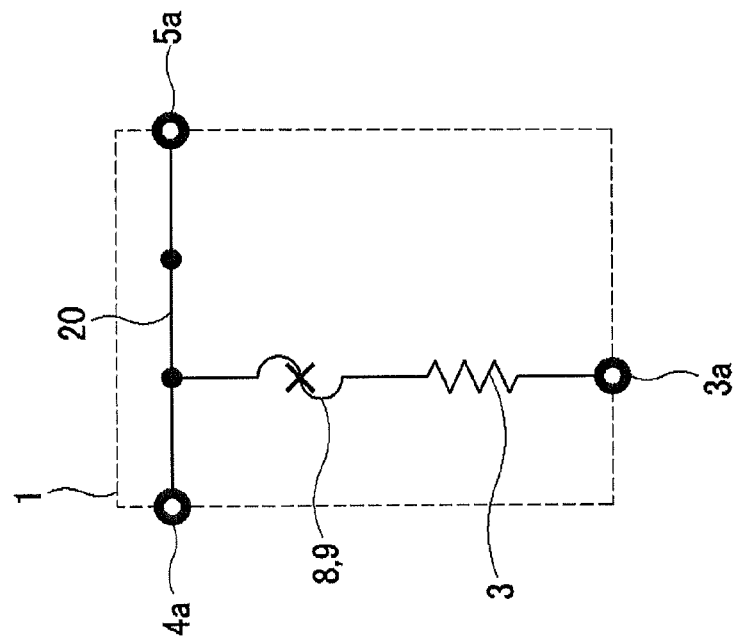
FIG. 2 (A) is a circuit diagram of a short-circuit element in switch-off state and FIG. 2 (B) is a circuit diagram of the short-circuit element in switch-on state.
Figure 2A:
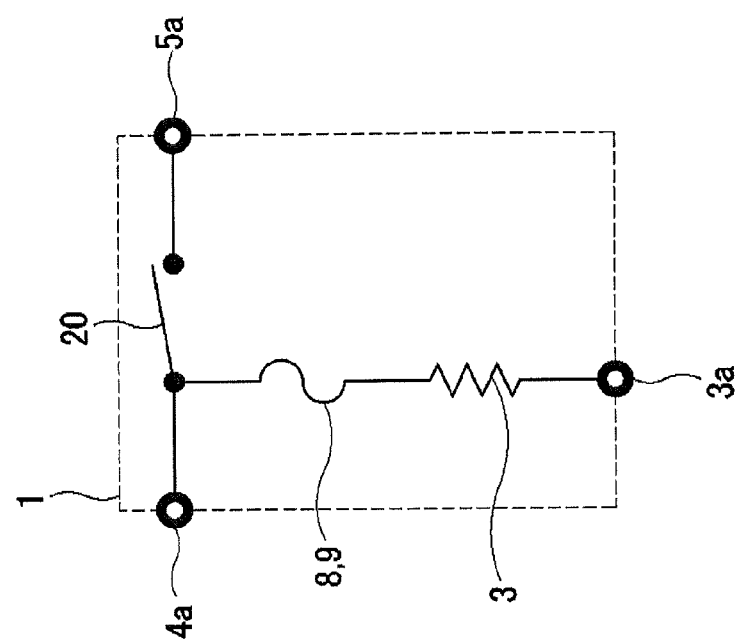

The above-described short-circuit element 1 has a circuit arrangement shown in FIGS. 2 (A) and (B). That is, the short-circuit element 1 constitutes a switch 20 in which a first electrode terminal 4a and a second electrode terminal 5a are normally isolated (FIG. 2 (A)) and when the first and second meltable conductors 8, 9 are melted by a heat generated by the heat-generating resistor 3, the first electrode terminal 4a and the second electrode terminal 5a are short-circuited via the melted conductor (FIG. 2 (B)). The first electrode terminal 4a and the second electrode terminal 5a constitute both terminals of the switch 20. The first meltable conductor 8 is connected to the heat-generating resistor 3 via a third electrode 6 and a heat-generating element extracting electrode 13.

As will be described further below, the short-circuit element 1 is incorporated into an electronic appliance and both of the terminals 4a and 5a of the switch 20 are connected to a current path of the electronic appliance in parallel, forming a bypass current path which can bypass an electronic component by short-circuiting the switch 20 when an abnormality occurs in the electronic component.

Figure 3A:
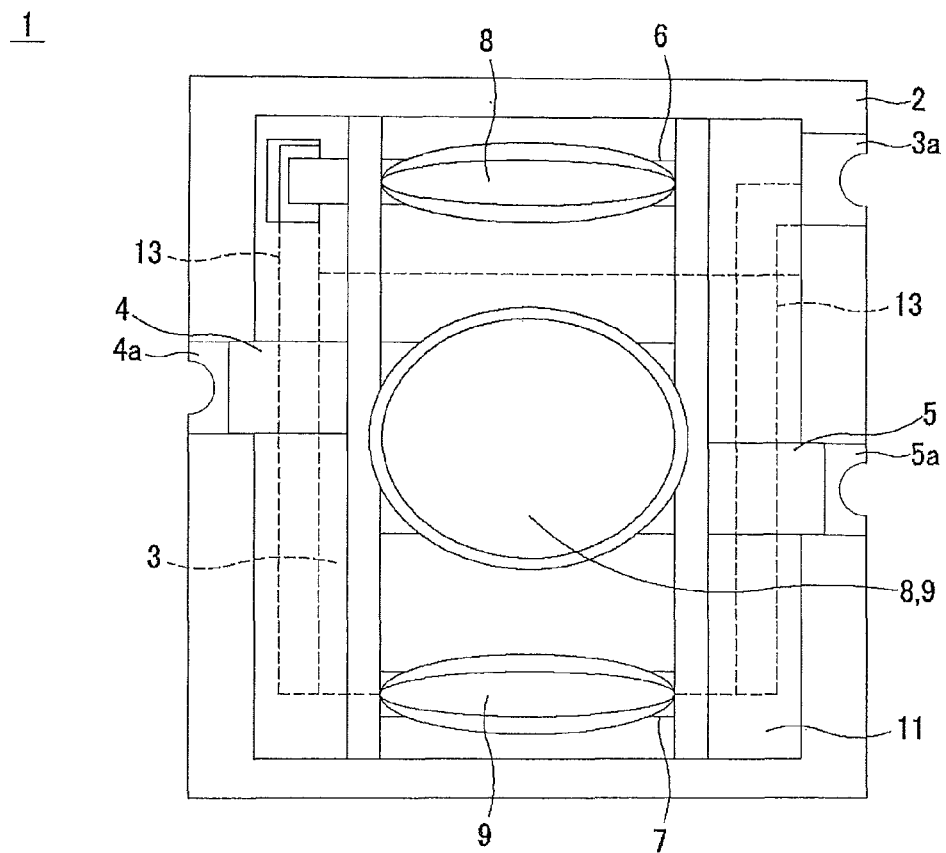
FIG. 3 (A) is a plan view of normally-isolated first and second electrodes short-circuited by a meltable conductor and FIG. 3 (B) is a cross-sectional view of the same.
Figure 3B:
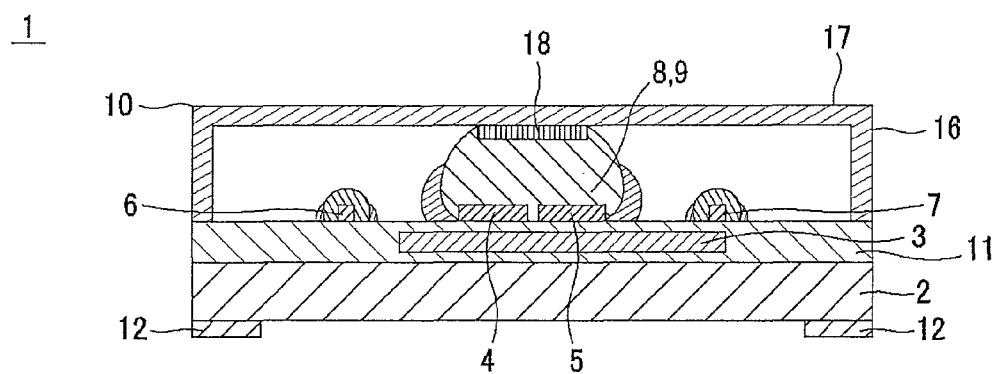
Figure 4:
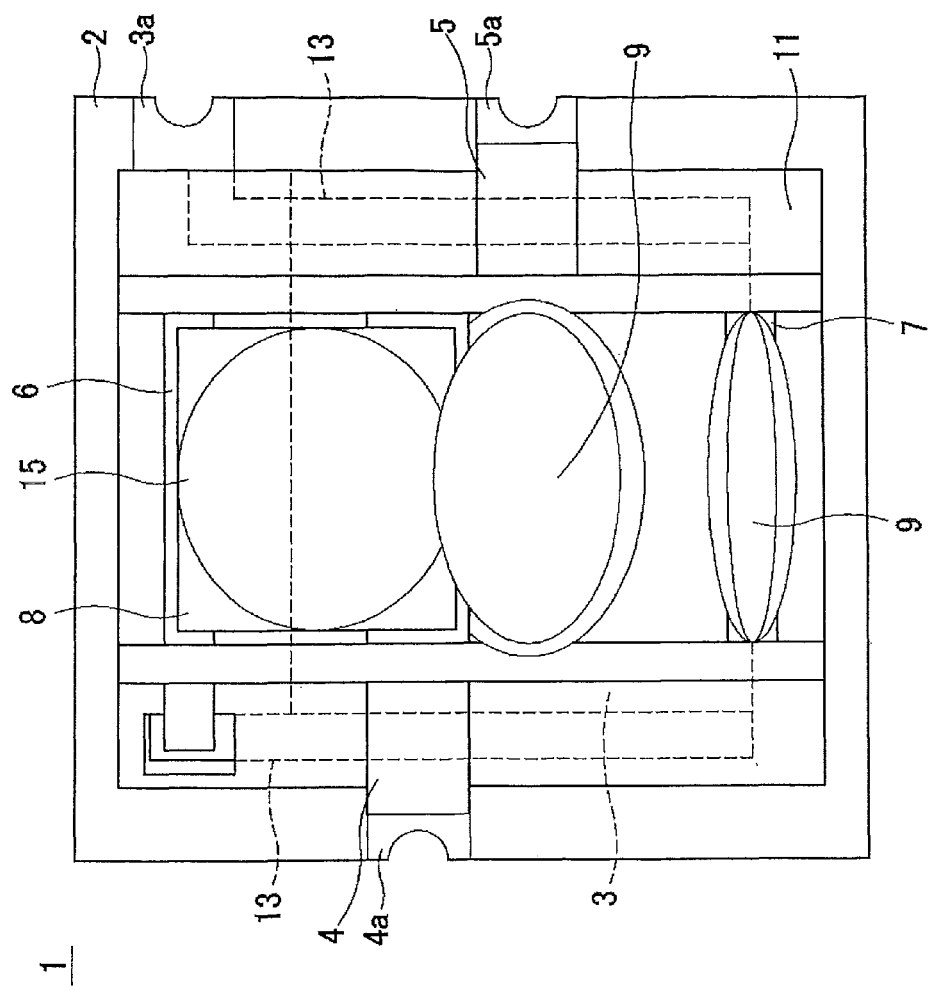
FIG. 4 is a plan view illustrating a state in which a second meltable conductor is melted antecedently.

In particular, in the case of an abnormality of the electronic component connected to the short-circuit element 1 in parallel, power is supplied to the heat-generating resistor 3 via the resistor terminal 3a and the heat-generating resistor 3 generates heat. This heat melts the first and second meltable conductors 8, 9, and then the meltable conductors gather on the first and second electrodes 4, 5 as shown in FIGS. 3 (A) and (B). Since the first and second electrodes 4, 5 are arranged adjacently to each other, the meltable conductors gathering on the first and second electrodes 4, 5 combine to short-circuit the first and second electrodes 4, 5. Thus, both of the terminals of the switch 20 in the short-circuit element 1 is short-circuited (FIG. 2 (B)).

It should be noted that the current flowing through the heat-generating resistor 3 is interrupted since the first and third electrodes 4 and 6 are disconnected when the first meltable conductor 8 blows.

Antecedent Melting of Second Meltable Conductor

In the short-circuit element 1, it is preferable for the second meltable conductor 9 to melt prior to the first meltable conductor 8. If the first meltable conductor 8 melts prior to the second meltable conductor 9, the path between the first and third electrodes 4 and 6 is interrupted before the second meltable conductor 9 melts, such that the amount of the meltable conductor combined on the first and second electrodes 4, 5 might be insufficient.

To avoid the above-described problem, in the short-circuit element 1 shown in FIG. 1 (A), the heat-generating resistor 3 is formed on the side having the second meltable conductor 9 such that the overlapping area with the second meltable conductor 9 is larger than that with the first meltable conductor 8. The heat-generating resistor 3, therefore, can heat nearly the entire surface of the second meltable conductor 9, and the heated area of the first meltable conductor 8 is relatively smaller, thus enabling the second meltable conductor 9 to melt prior to the first meltable conductor 8.

Figure 5:
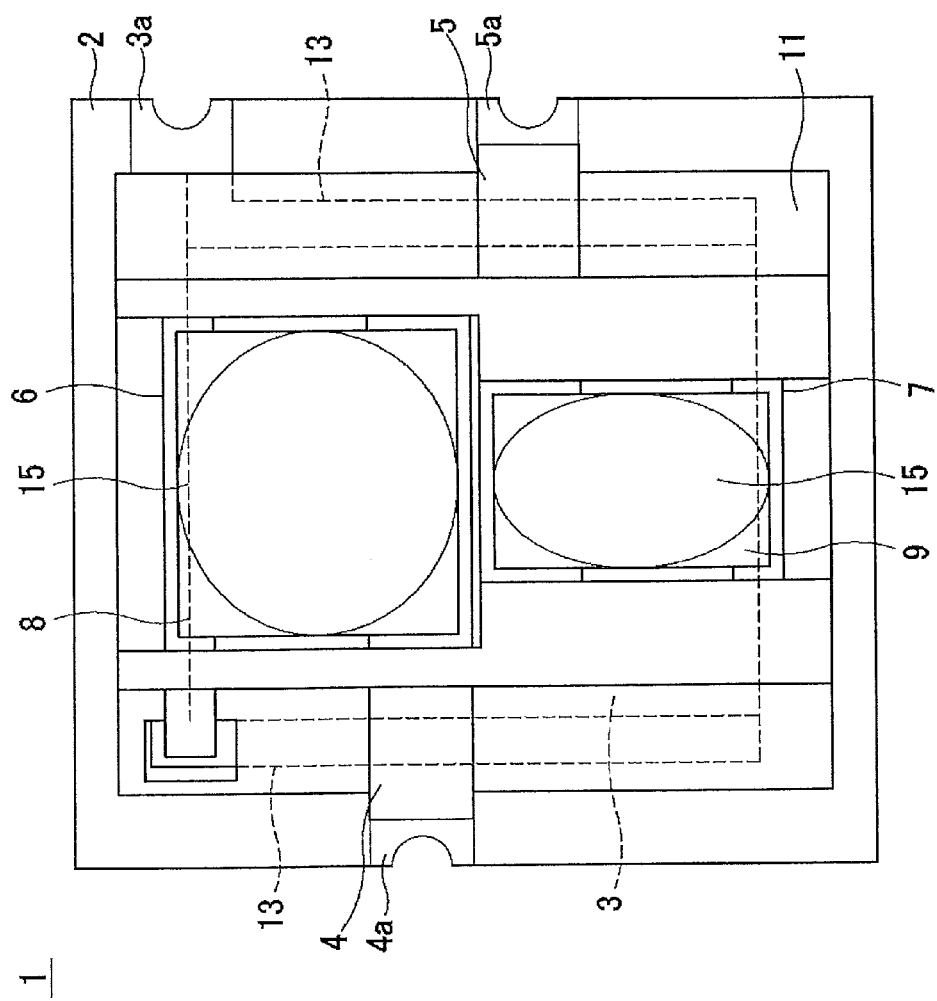
FIG. 5 is a plan view of a short-circuit element having a narrower second meltable conductor.

As shown in FIG. 5, the second meltable conductor 9 of the short-circuit element 1 may be formed to be narrower than the first meltable conductor 8, such that the second meltable conductor 9 melts prior to the first meltable conductor 8. The second meltable conductor 9 formed to be narrower reduces the melting time, thus enabling the second meltable conductor 9 to melt prior to the first meltable conductor 8.

Electrode Area

In addition, in the short-circuit element 1, the area of the first electrode 4 is preferably larger than that of the third electrode 6, and the area of the second electrode 5 is preferably larger than that of the fourth electrode 7. Since the meltable conductor capacity is proportional to the electrode area, by forming the first and second electrodes 4, 5 to be larger than the third and fourth electrode 6 and 7, a larger amount of meltable conductor can gather on the first and second electrodes 4, 5, thus assuring short-circuiting of the first and second electrodes 4, 5 (FIG. 1 (B) and FIG. 3 (B)).

Alternative Example of Short-Circuit Element

Figure 6:
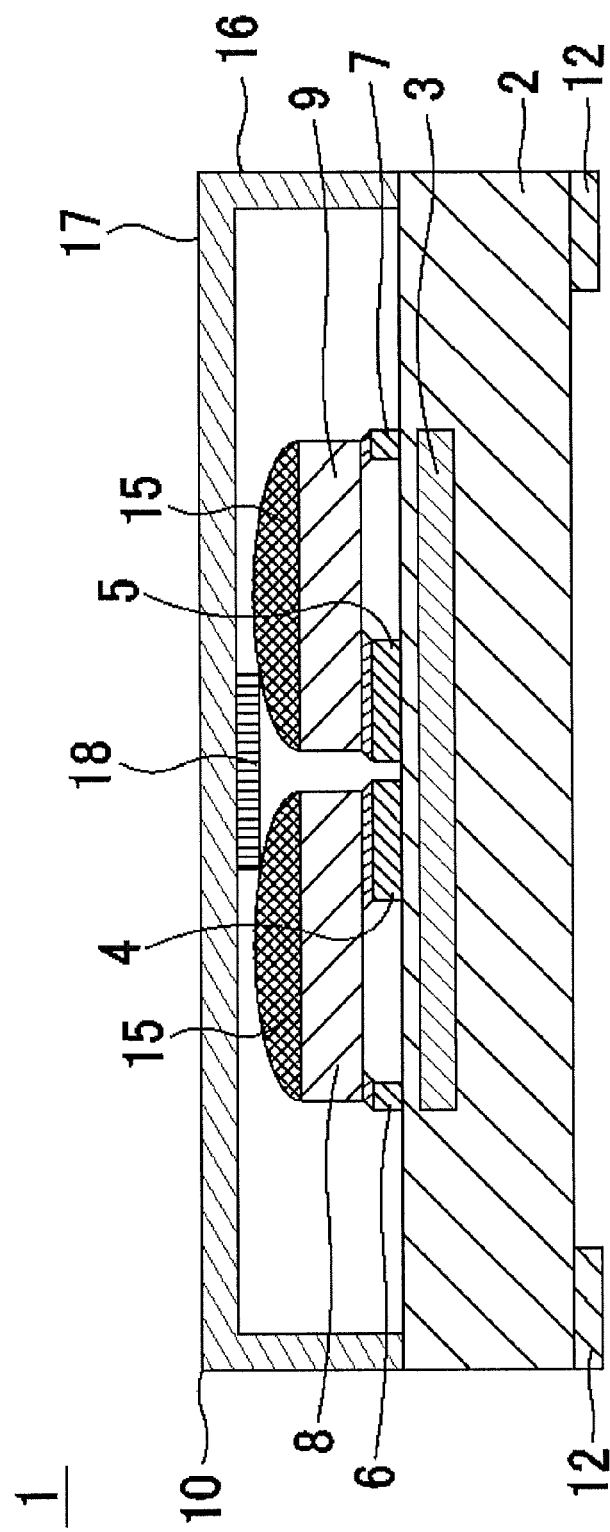
FIG. 6 is a cross-sectional view of an alternative embodiment of the short-circuit element.

In the short-circuit element 1, the heat-generating resistor 3 is not necessarily covered with the insulating layer 11 and the heat-generating resistor 3 may be disposed within the insulating substrate 2 as shown in FIG. 6. By using a material having an excellent heat-conductivity for the insulating substrate 2, the heat-generating resistor 3 can be heated to the same extent/degree as when heating via the insulating layer 11 made from such materials as glass.

Figure 7:
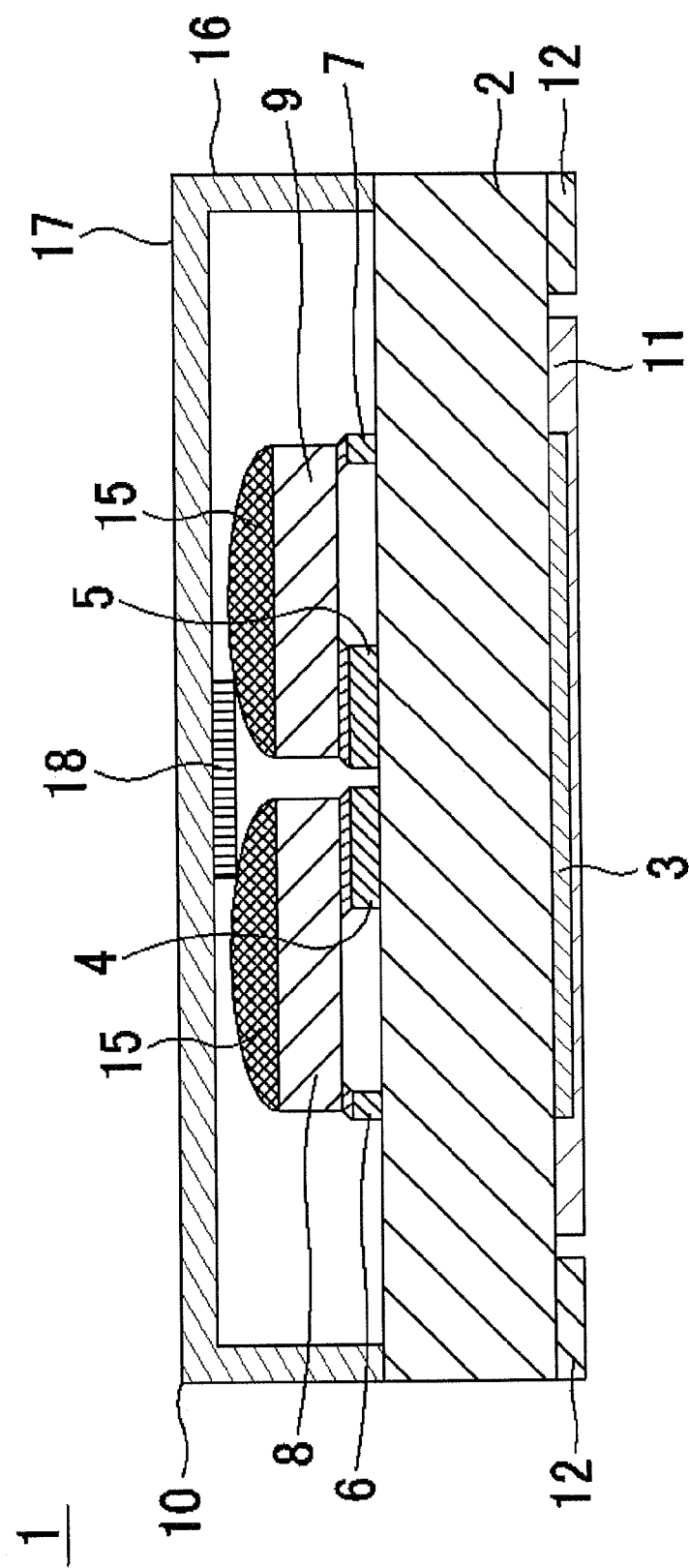
FIG. 7 is a cross-sectional view of an alternative embodiment of the short-circuit element.

Moreover, in the short-circuit element 1, rather than forming the heat-generating resistor 3 on the surface of the insulating substrate 2 on which the first to fourth electrodes 4, 5, 6 and 7 are formed as described above, the heat-generating resistor 3 may be formed on the back surface of the insulating substrate 2 opposing the surface on which the first to fourth electrodes 4, 5, 6 and 7 are formed, as shown in FIG. 7. Forming the heat-generating resistor 3 on the back surface of the insulating substrate 2 enables a simpler formation process than in the case of forming the heat-generating resistor 3 within the insulating substrate 2. In this case, forming the insulating layer 11 on the heat-generating resistor 3 is preferable so as to protect the resistor and ensure insulation after mounting.

Figure 8:
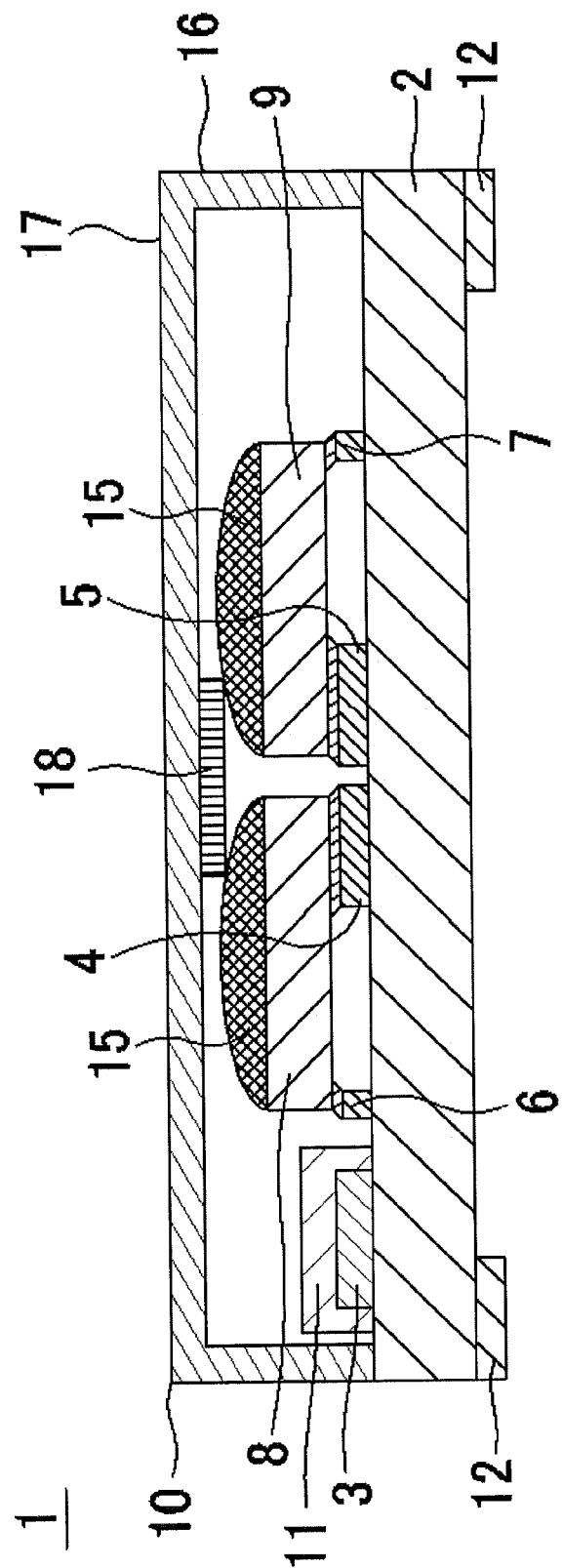
FIG. 8 is a cross-sectional view of an alternative embodiment of the short-circuit element.

In addition, as shown in FIG. 8, the heat-generating resistor 3 of the short-circuit element 1 may be formed on the surface of the insulating substrate 2 on which the first to fourth electrodes 4, 5, 6 and 7 are formed. Forming the heat-generating resistor 3 on the back surface of the insulating substrate 2 enables a simpler formation process than in the case of forming the heat-generating resistor 3 within the insulating substrate 2. In this case, forming the insulating layer 11 on the heat-generating resistor 3 is also preferable.

Omission of Fourth Electrode and Second Meltable Conductor

Figure 9A:
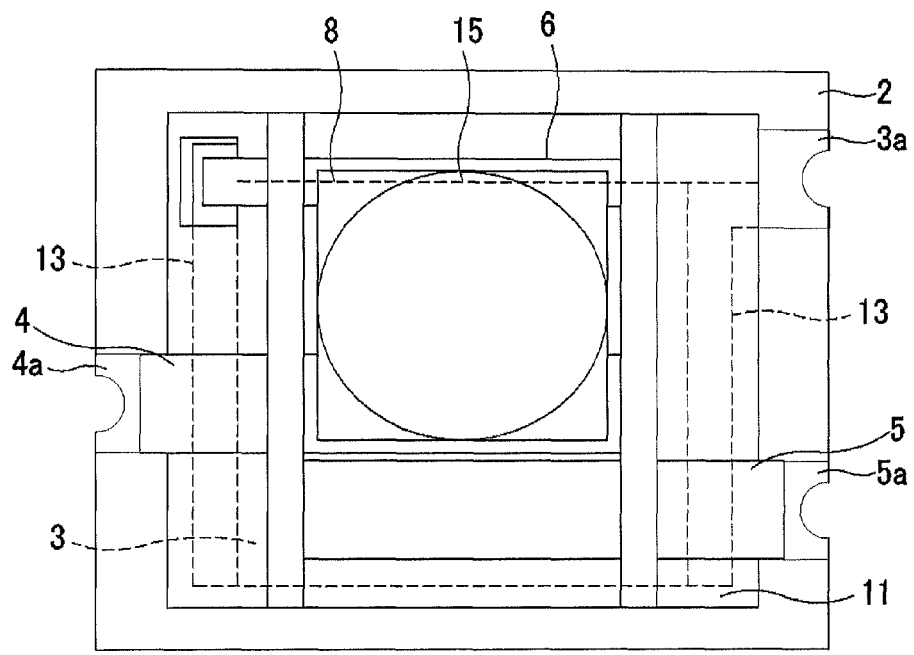
FIG. 9 (A) is a plan view a short-circuit element in which the fourth electrode and the second meltable conductor are omitted, and FIG. 9 (B) is a cross-sectional view of the same.
Figure 9B:
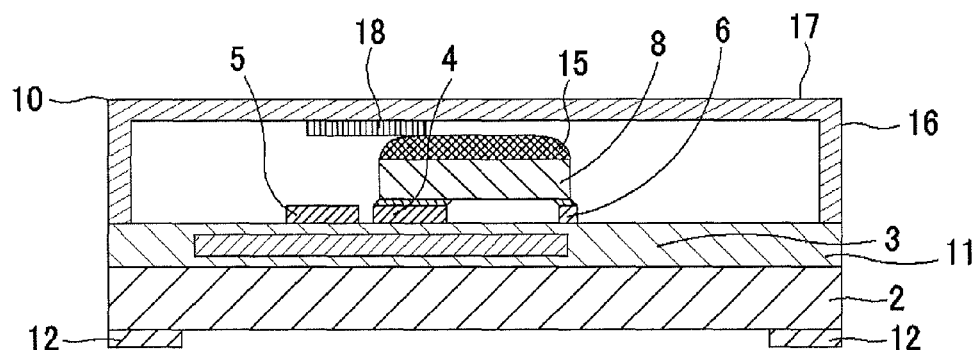

As shown in FIGS. 9 (A) and (B), the short-circuit element 1 according to the present invention may omit the fourth electrode 7 and the second meltable conductor 9. In this short-circuit element 1, the first meltable conductor 8 connecting across the first and third electrodes 4 and 6 melt and wet-spread to short-circuit the first and second electrodes 4, 5. The components of this short-circuit element 1 are the same as those of the short-circuit element described above except for the omission of the fourth electrode 7 and the second meltable conductor 9, and they are designated by the same symbols to avoid repetition of explanation.

Figure 10:
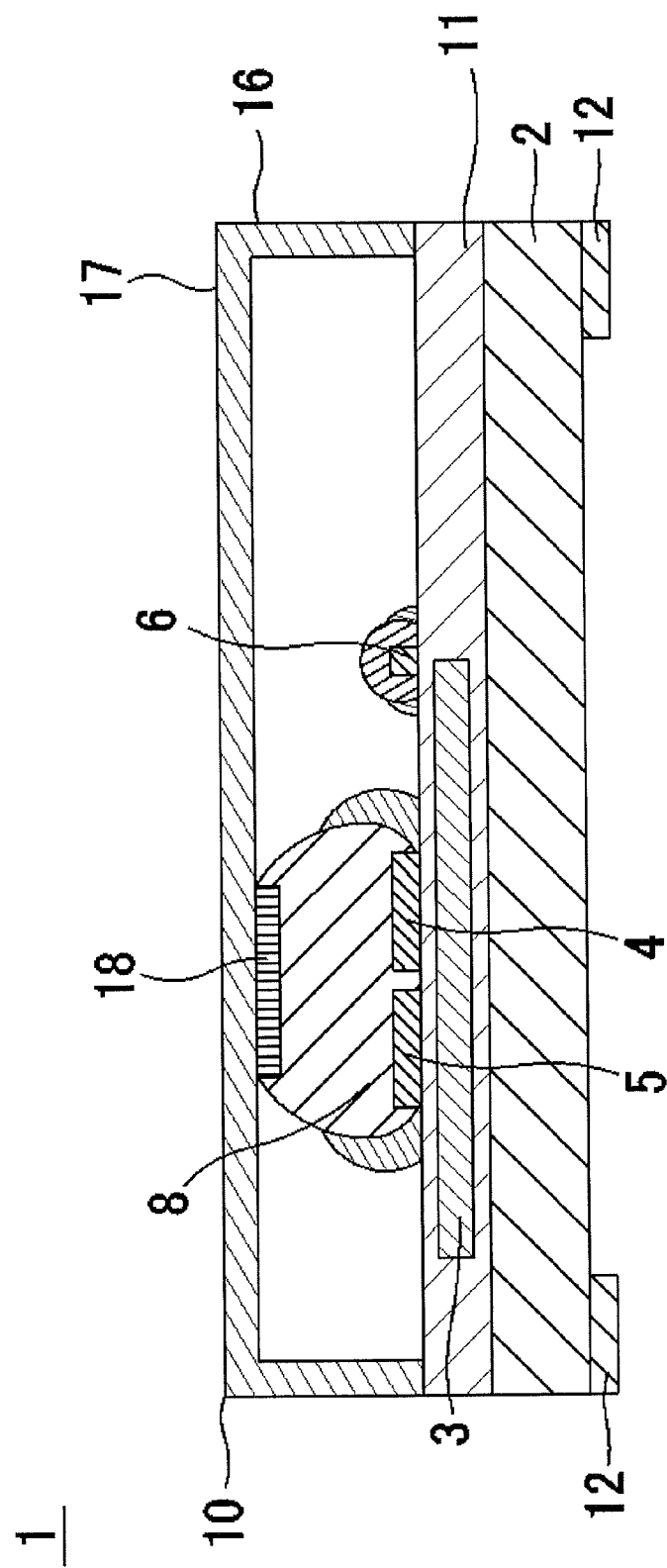
FIG. 10 is a cross-sectional view of a short-circuit element in which the fourth electrode and the second meltable conductor are omitted, illustrating normally-isolated first and second electrodes short-circuited by a meltable conductor.

In this short-circuit element 1, it is also desirable that the first and second electrodes 4, 5 have an area larger than the third electrode 6. In the short-circuit element 1 of this constitution, as shown in FIG. 10, a larger amount of meltable conductor can gather on the first and second electrodes 4, 5, thus ensuring short-circuiting of the first and second electrodes 4, 5.

The short-circuit element shown in FIGS. 9 (A) and (B) may have a second meltable conductor arranged on the second electrode 5. The second meltable conductor on the second electrode 5 is heated by the heat-generating resistor 3 and melts together with the first meltable conductor 8 to draw the first meltable conductor 8. This short-circuits the first electrode 4 and the second electrode 5.

In addition, a protective resistor may be provided which is connected to one of the first electrode 4 and the second electrode 5. The protective resistor has a resistance corresponding to an internal resistance of the electronic component connected to the short-circuit element.

Figure 11A:
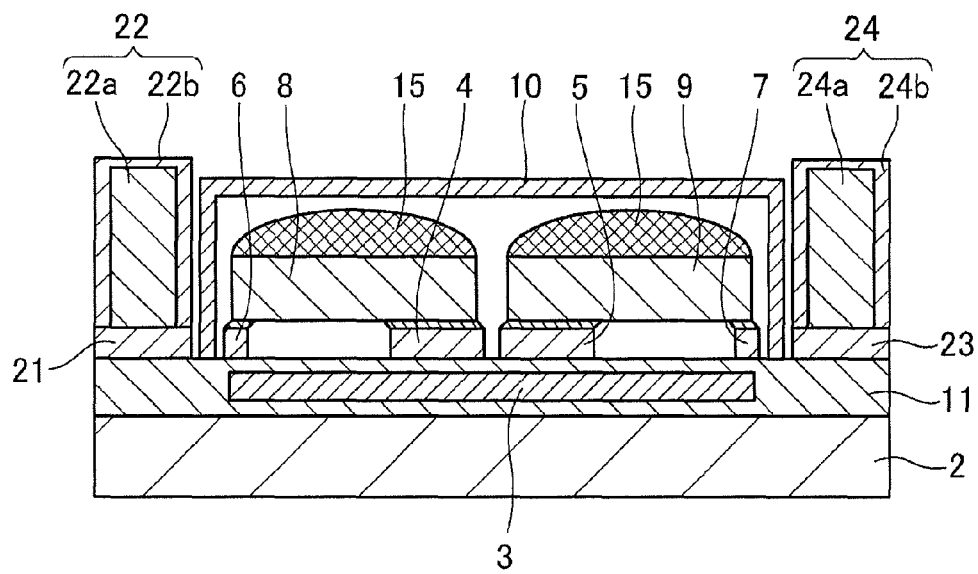
FIG. 11 (A) shows a short-circuit element according to the present invention before melting of the meltable conductor and FIG. 11 (B) shows the same but after melting of the meltable conductor.
Figure 11B:
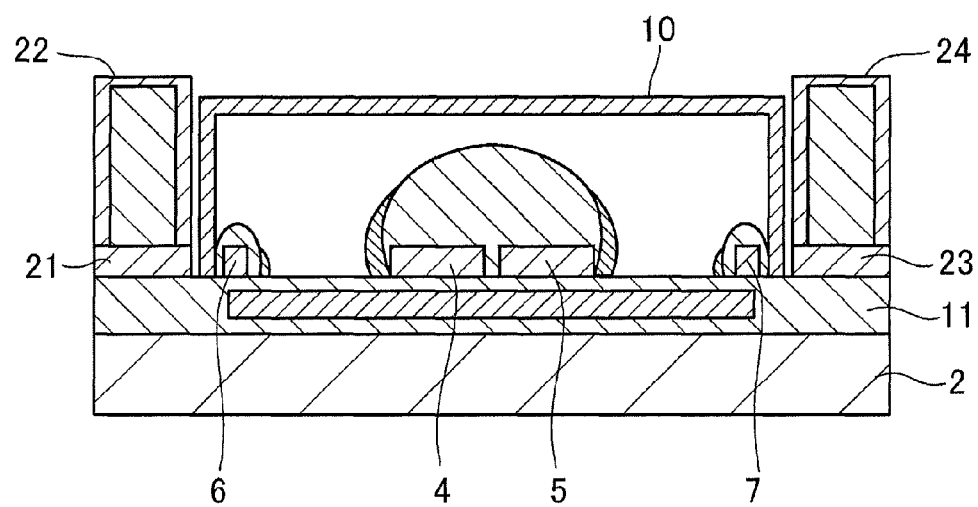

In addition to forming the external terminal 12 connected to the first and second electrodes via the through hole on the back surface of the insulating substrate 2, as is the case of the short-circuit element 25 shown in FIGS. 11 (A) and (B), the short-circuit element according to the present invention may have, on the surface of the insulating substrate 2 on which the first and second electrodes 4, 5 are formed, a first external connecting electrode 21 continuous with the first electrode 4, one or more first external connecting terminals 22 provided on the first external connecting electrode 21, a second external connecting electrode 23 continuous with the second electrode 5, and one or more of the second external connecting terminals 24 provided on the second external connecting electrode 23.

The first and second external connecting electrodes 21, 23 are electrodes for connecting the short-circuit element 25 to the electronic appliance to which the short-circuit element 25 is incorporated, the first external connecting electrode 21 being continuous with first electrode 4 and the second external connecting electrode 23 being continuous with the second electrode 5.

The first and second external connecting electrodes 21, 23 are made of a normal electrode material such as Cu and Ag, and formed on the surface of the insulating substrate 2 on which the first and second electrodes 4, 5 are formed. That is, as shown in FIG. 11, the surface of the short-circuit element 25 on which the meltable conductor 13 is provided will be the mounting surface. It should be noted that the first and second external connecting electrodes 21, 23 can be formed simultaneously with the first and second electrodes 4, 5.

The first external connecting electrode 21 includes a first external connecting terminal 22 formed thereon. Similarly, the second external connecting electrode 23 includes a second external connecting terminal 24 formed thereon. These first and second external connecting terminals 22, 24 are connecting terminals for mounting the short-circuit element onto the electronic appliance and are formed by using a metal bump or metal post. In addition, as shown in FIG. 11 (A), the first and second external connecting terminals 22, 24 have a height exceeding the covering member 10 provided over the insulating substrate 2 and are mountable to a substrate constituting the mounting target of the short-circuit element 25.

It should be noted that the heat-generating resistor 3 of the short-circuit element 25 includes a resistor connecting terminal 3b formed on the heat-generating element extracting electrode 13 and the resistor terminal 3a. The resistor connecting terminal 3b is formed by using a metal bump or metal post similarly to the first and second external connecting terminals 22, 24, and protrudes upward from the insulating layer 11.

Although the external terminal 12 of the short-circuit element 1 is formed on the back surface of the insulating substrate 2 and is connected to the first and second electrodes 4, 5 via the through hole, the external connecting terminals 22, 24 of the short-circuit element 25 are formed, via the external connecting electrodes 21, 23, on the surface on which the first and second electrodes 4, 5 are formed. In the short-circuit element 25 shown in FIG. 11 (B), the combined resistance of the first external connecting terminal 22 and the second external connecting terminal 24 is lower than the conduction resistance between the first and second external connecting electrodes 21, 23 when the first electrode 4 and the second electrode 5 are short-circuited.

This increases the rated current of the short-circuit element 25 when the first and second electrodes 4, 5 are short-circuited and form a bypass current path such that the short-circuit element 25 can accommodate a large current. Further increase of the rated current of the short-circuit element is desired in large current applications of lithium ion secondary batteries used for a power source of HEVs or EVs. The conduction resistance between the first and second external connecting electrodes 21, 23 short-circuited by the meltable conductor can be reduced to a value (for example, 0.4 m$\Omega$ or less) sufficient to increase the rated current.

However, in the short-circuit element 1, in which the external terminal 12 is formed on the back surface of the insulating substrate 2 and connected to the first and second electrodes 4, 5 via the through hole, the conduction resistance between the first and second electrodes 4, 5 and the external terminal 12 is high (for example, 0.5 to 1.0 m$\Omega$), such that reduction of the entire conduction resistance is limited even if the through hole is filled with a conductor.

In addition, large current flowing between the first and second electrodes 4, 5 and the external terminal 12 having a high resistance generates a heat, which might damage the bypass current path and might thermally affect other peripheral devices.

On the other hand, the external connecting terminals 22, 24 of the short-circuit element 25 are formed on the surface on which the first and second electrodes 4, 5 are formed. The shape and size of the external connecting terminals 22, 24, which are formed on the external connecting electrodes 21, 23, can be designed flexibly, such that terminals having low conduction resistance can be achieved. In the short-circuit element 25, the combined resistance of the first external connecting terminal 22 and the second external connecting terminal 24 is lower than the conduction resistance between the first and second external connecting electrodes 21, 23 when the first electrode 4 and the second electrode 5 are short-circuited.

Consequently, the short-circuit element 25 can easily reduce the conduction resistance beyond the first and second external connecting electrodes 21, 23, which must be high in the case of the short-circuit element 1, thus remarkably improving the current rating.

The first and second external connecting terminals 22, 24 may be formed by using a metal bump or metal post made of Pb free solder consisting essentially of Sn. Any shape of metal bump or metal post may be used. The resistances of the first and second external connecting terminals 22, 24 are determined by the material, shape and size. For example, in the case of a rectangular metal post having a Cu core coated with a solder (Cu core: 0.6 mm×0.6 mm, cross-sectional area: 0.36 mm$^2$, height: 1 mm, specific resistance: 17.2 $\mu$m$\Omega$·mm), the resistance of the Cu core of the terminal is approximately 0.048 m$\Omega$ and, by taking account of the solder coating, the resistance between the serially connected first and second external connecting terminals 22, 24 is 0.096 m$\Omega$ or less, which is sufficiently low to improve the entire rating of the short-circuit element 25.

It should be noted that the conduction resistance between the short-circuited first and second external connecting electrodes 21, 23 of the short-circuit element 25 can be determined by calculating the total resistance of the entire device from the resistance between the short-circuited first and second external connecting terminals 22, 24, and calculating the difference between this total resistance and the known combined resistance of the first and second external connecting terminals 22, 24. The combined resistance of the first and second external connecting terminals 22, 24 of the short-circuit element 25 can be determined by the difference between the measured resistance of the short-circuited first and second external connecting electrodes 21, 23 and the total resistance of the entire device during the short-circuit.

Figure 12:
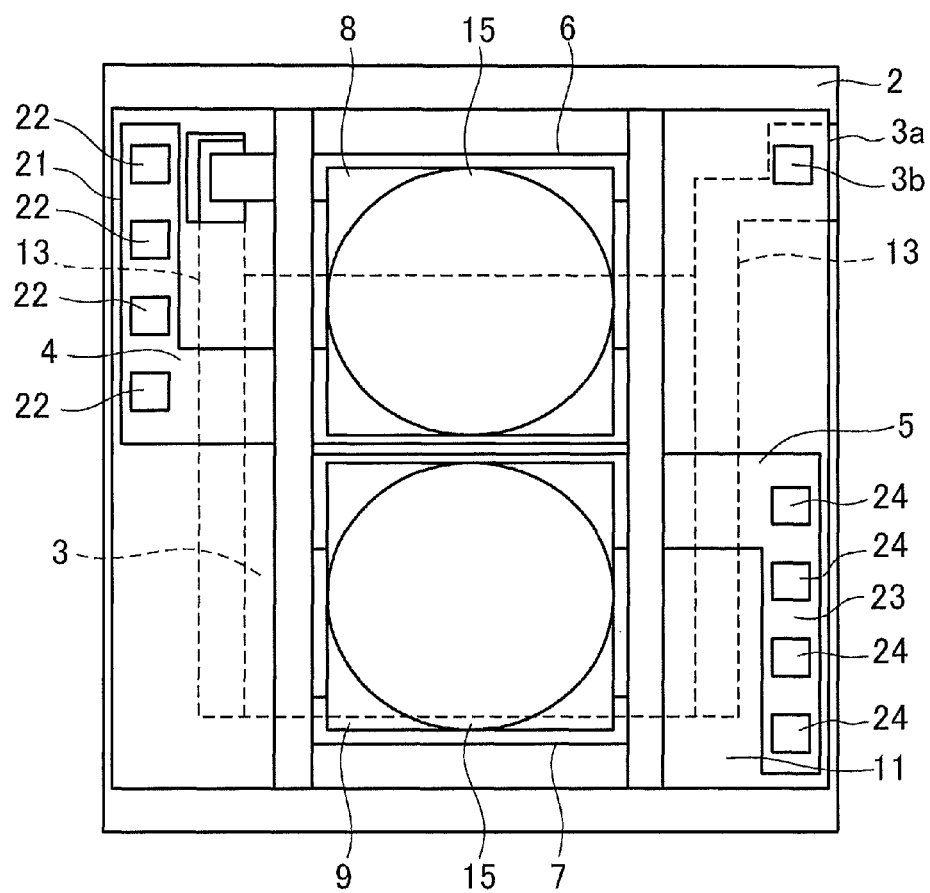
FIG. 12 is a plan view of another short-circuit element according to the present invention.

Furthermore, the conduction resistance of the short-circuit element 25 may be reduced by widening the first and second external connecting electrodes 21, 23 with a rectangular shape, for example, and providing a plurality of the first and second external connecting terminals 22, 24, as shown in FIG. 12. Alternatively, the conduction resistance of the short-circuit element 25 may be reduced by providing the first and second external connecting terminals 22, 24 having a larger diameter on the widened first and second external connecting electrodes 21, 23.

In addition, the first and second external connecting terminals 22, 24 may be formed by coating high melting point metal cores 22a, 24a with low melting point metal layers 22b, 24b. The preferable metal constituting the low melting point metal layer 22b, 24b may be a Pb free solder consisting essentially of Sn, and the high melting point metal 22a, 24a may be an alloy consisting essentially of Cu or Ag.

By coating the high melting point metal 22a, 24a with the low melting point metal layer 22b, 24b, in the case that the short-circuit element 25 is mounted by reflow, even if the low melting point metal is melted by the reflow temperature exceeding the melting point of the low melting point metal layer 22b, 24b, the first and second external connecting terminals 22, 24 will not melt. In addition, the first and second external connecting terminals 22, 24 can be connected to the first and second external connecting electrodes 21, 23 by using the low melting point metal constituting the outer layer.

The first and second external connecting terminals 22, 24 can be formed by depositing the low melting point metal onto the high melting point metal 22a, 24a by using a plating method or may be formed by using another conventional laminating method or film forming method.

In addition to forming the first and second external connecting terminals 22, 24 by using a metal bump or metal post, they can be formed as conductive plating layers or conductive layers formed by applying a conductive paste.

The first and second external connecting terminals 22, 24 may be provided in advance on a mounting target onto which the short-circuit element 25 is to be mounted, such that they are connected to the first and second external connecting electrodes 21, 23 on a mounting member on which the short-circuit element is mounted.

LED Compensation Circuit

Figure 13A:
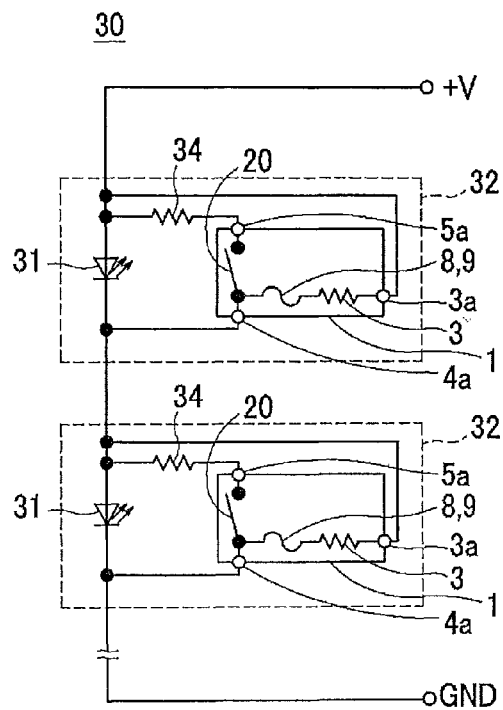
FIGS. 13 (A) and (B) are circuit diagrams of an LED illumination apparatus using a short-circuit element in a normal state, FIG. 13 (C) is a circuit diagram of the same in an abnormal state, and FIG. 13 (D) is a circuit diagram of the same in a state in which a bypass current path is formed.
Figure 13B:
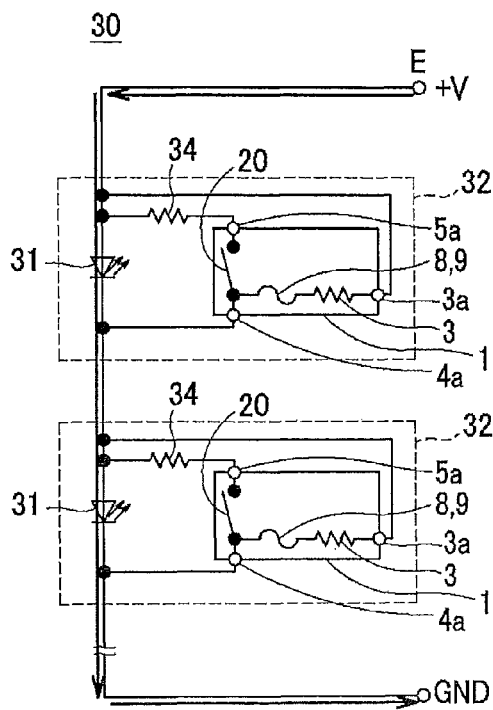
Figure 13C:
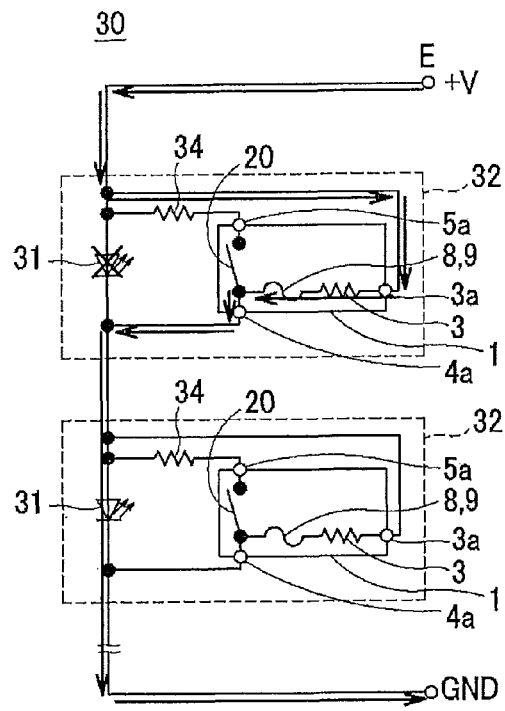
Figure 13D:
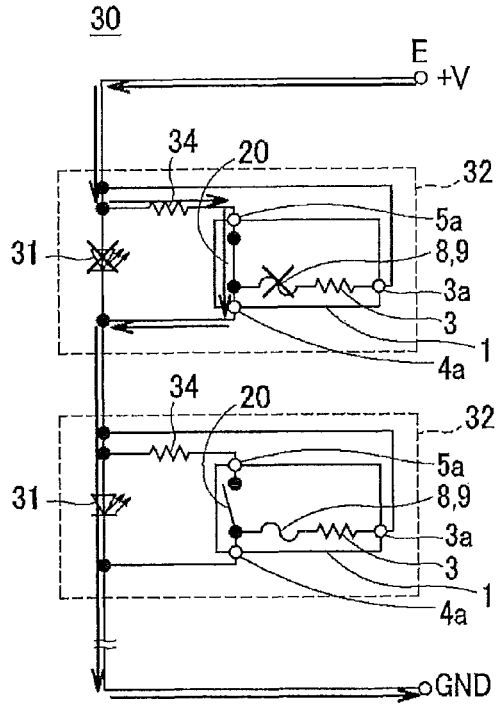

A circuit arrangement of an electronic appliance incorporating the short-circuit element 1 will be explained below. FIG. 13 shows a circuit arrangement of an LED illumination apparatus 30 as an example of electronic appliance. As shown in FIG. 13(A), in the LED illumination apparatus 30, a plurality of light emitting diodes 31 are connected in series on the current path. Furthermore, each light emitting diode 31 of the LED illumination apparatus 30 is connected to both terminals 4a, 5a of the switch 20 of the short-circuit element 1 via the protective resistor 34 in parallel and the resistor terminal 3a of the short-circuit element 1 is connected to the current path to form the LED unit 32. In the LED illumination apparatus 30, a plurality of the LED units 32 are connected in series.

The resistance of the protective resistor 34 corresponds to the internal resistance of the light emitting diode 31. On the other hand, the resistance of the heat-generating resistor 3 is larger than the internal resistance of the light emitting diode 31. Consequently, if the light emitting diode 31 operates normally, the current E of the LED illumination apparatus 30 flows through the light emitting diode 31 rather than through the short-circuit element 1, as shown in FIG. 13 (B).

On the other hand, if an abnormality occurs in the light emitting diode 31 to electrically disconnect the light emitting diode 31, current E of the LED illumination apparatus 30 flows through the resistor terminal 3a of the short-circuit element 1, as shown in FIG. 13 (C). In this situation, the heat-generating resistor 3 of the short-circuit element 1 generates heat to melt the first and second meltable conductors 8, 9 and the melted conductors gather on the first and second electrodes 4, 5. Consequently, in the short-circuit element 1, both of the terminals 4a, 5a of the switch 20 can be short-circuited to form a bypass current path, as shown in FIG. 13 (D). It should be noted that the blowout of the first and second meltable conductors 8, 9 interrupts the current supplied to the heat-generating resistor 3.

In this LED illumination apparatus 30, even if an abnormality occurs in one of the light emitting diodes 31, a bypass current path bypassing the damaged light emitting diode 31 can be formed to retain the illumination function by the remaining of normal light emitting diodes 31. In this situation, since the resistance of the protective resistor 34 of the LED illumination apparatus 30 is almost the same as the internal resistance of the light emitting diode 31, the current flowing through the bypass current path will be almost the same as the normal operating current.

Battery Compensation Circuit

Figure 14A:
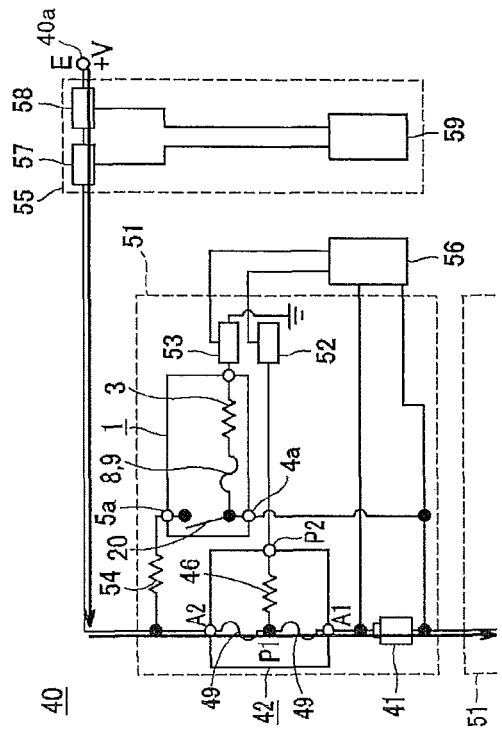
FIGS. 14 (A) and (B) are circuit diagrams of an battery pack using a short-circuit element in a normal state, FIG. 14 (C) is a circuit diagram of the same in an abnormal state, and FIG. 14 (D) is a circuit diagram of the same in a state in which a bypass current path is formed.
Figure 14B:
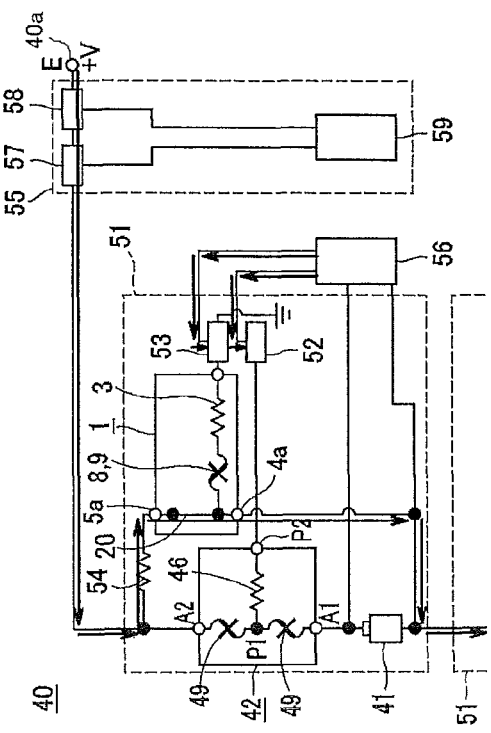
Figure 14C:
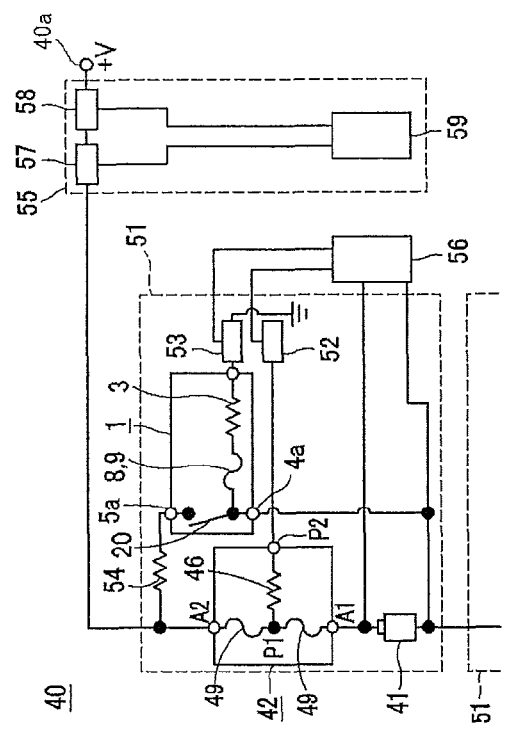
Figure 14D:
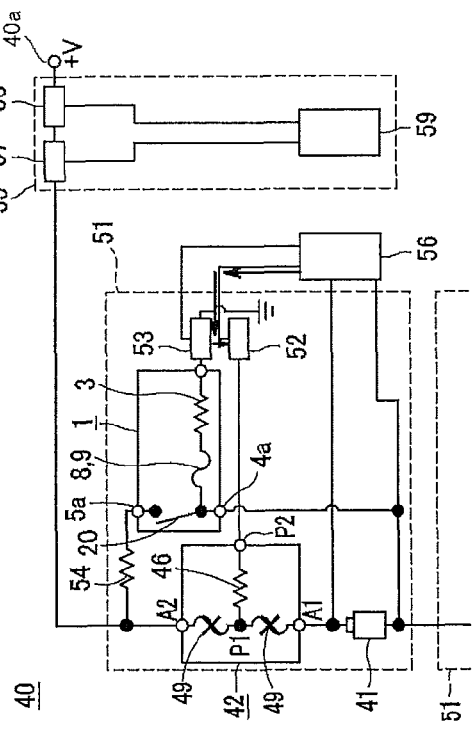

Next, another circuit arrangement of an electronic appliance incorporating the short-circuit element 1 will be explained below. FIG. 14 shows a circuit arrangement of a battery pack 40 incorporating a lithium ion battery installed in and used for various electronic appliances including vehicles and electric power tools. As shown in FIG. 14(A), the battery pack 40 realizes a high voltage and large current by connecting the battery cells 41 in series on the current path. In addition, each battery cell 41 of the battery pack 40 is connected to a protective element 42 so as to interrupt the current path if an abnormality such as over-charging or over-discharging of the relevant battery cell 41 occurs.

Arrangement of Protective Element

Figure 15A:
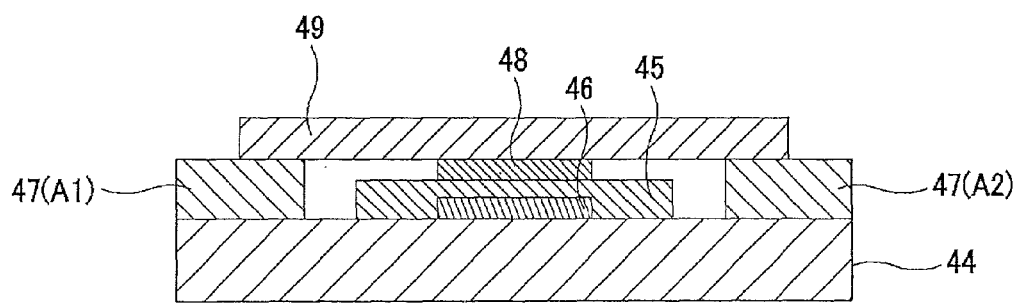
FIG. 15 (A) is a cross-sectional view of a protective element and FIG. 15 (B) is a plan view of the same.
Figure 15B:
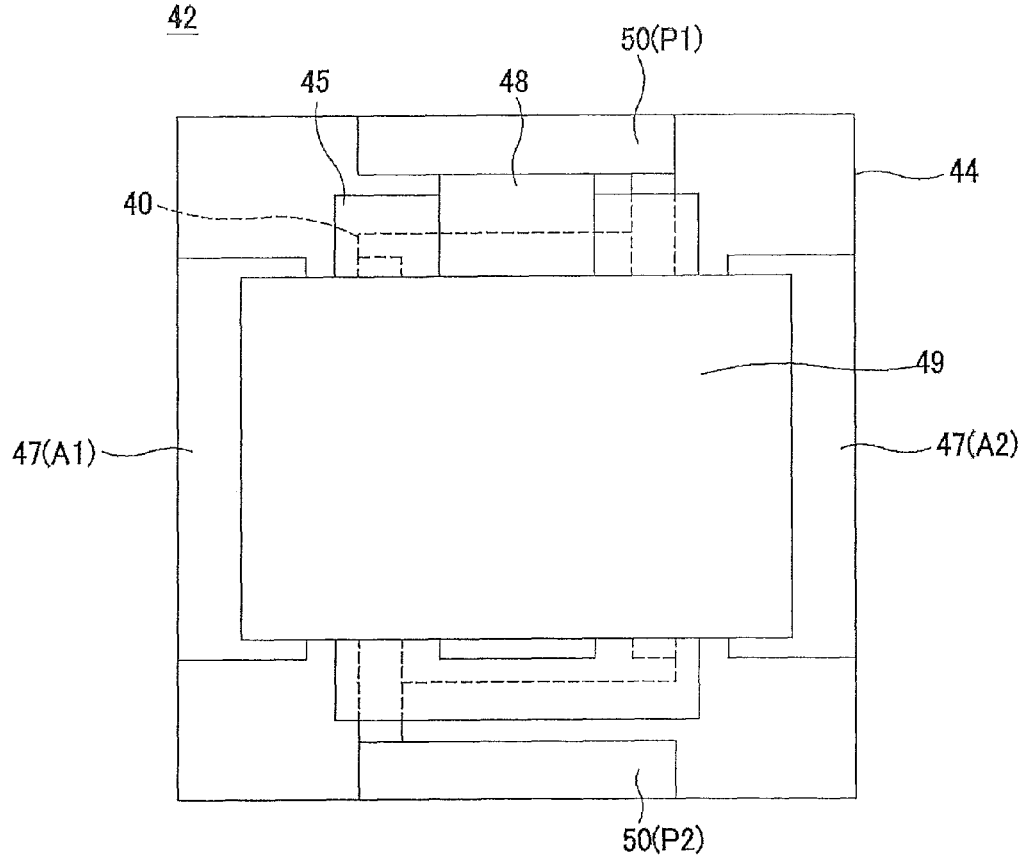

As shown in FIGS. 15 (A) and (B), the protective element 42 includes an insulating substrate 44, a heat-generating resistor 46 laminated on the insulating substrate 44 and covered with an insulating member 45, electrodes 47 (A1), 47 (A2) formed on both of the ends of the insulating substrate 44, a heat-generating element extracting electrode 48 laminated on the insulating member 45 and overlapping the heat-generating resistor 46, and a meltable conductor 49 both ends of which are connected to the electrodes 47 (A1), 47 (A2), respectively, and the central portion of which is connected to the heat-generating element extracting electrode 48.

The insulating substrate 44 is formed in an approximately rectangular shape by using the same material as the above described insulating substrate 2. The heat-generating resistor 46 is formed by using the same material and method for manufacturing the heat-generating resistor 3 described above. In the protective element 42, the insulating member 45 is arranged such that it covers the heat-generating resistor 46, and the heat-generating element extracting electrode 48 is disposed facing the heat-generating resistor 46 via this insulating member 45. The insulating member 45 may be laminated between the heat-generating resistor 46 and the insulating substrate 44 so as to efficiently conduct the heat of the heat-generating resistor 46 to the meltable conductor 49. One end of the heat-generating element extracting electrode 48 is connected to a heat-generating element electrode 50 (P1). The other end of the heat-generating resistor 46 is connected to another heat-generating element electrode 50 (P2). The meltable conductor 49 may be the same as the first and second meltable conductors 8, 9.

It should be noted that, as is the case of the short-circuit element 1, a flux may be applied on almost the entire surface of the meltable conductor 49 of the protective element 42 in order to prevent oxidation of the meltable conductor 49. Moreover, the protective element 42 may include a covering member over the insulating substrate 44 for internal protection.

Figure 16:
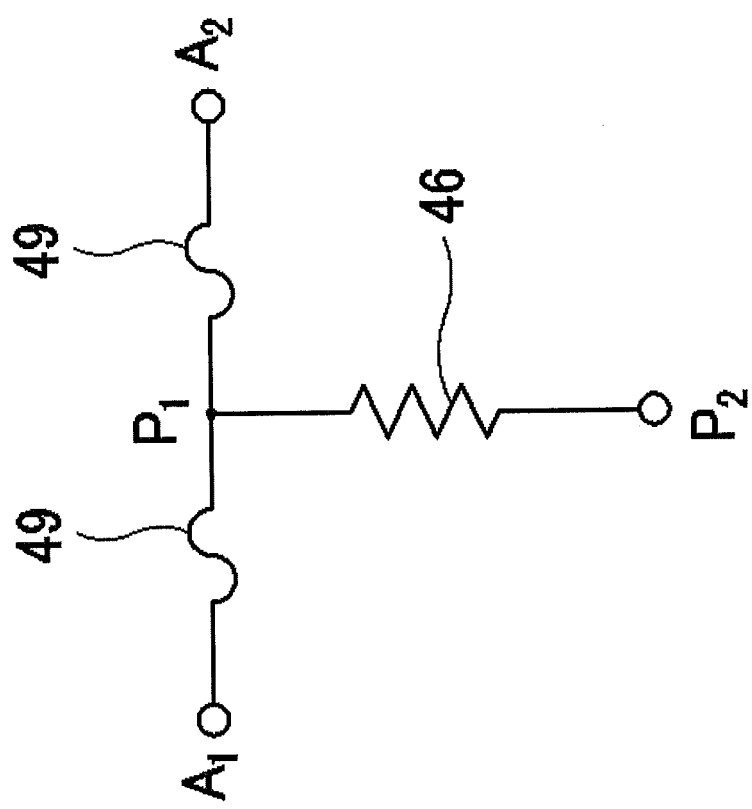
FIG. 16 is a circuit diagram of a protective element.

FIG. 16 shows a circuit arrangement of the protective element 42. As shown, the circuit arrangement of the protective element 42 includes the meltable conductor 49 serially connected via the heat-generating element extracting electrode 48, and the heat-generating resistor 46 through which a current is supplied via the connection point of the meltable conductor 49 to generate heat to melt the meltable conductor 49. One of the two electrodes 47 of the protective element 42 is connected to A1 and the other is connected to A2. In addition, the heat-generating element extracting electrode 48 and the heat-generating element electrode 50 connected thereto are connected to P1 and the other heat-generating element electrode 50 is connected to P2.

Circuit Arrangement of Battery Pack

The protective element 42 may be used in a circuit of a battery pack 40 of a lithium ion secondary battery, as shown FIG. 14 (A). The battery pack 40 includes a plurality of battery units 51 each having the battery cell 41, the protective element 42, the short-circuit element 1, the first current controlling element 52 for controlling the operation of the protective element 42, the second current controlling element 53 for controlling the operation of the short-circuit element 1, and the protective resistor 54, and these battery units 51 are connected in series.

In addition, the battery pack 40 includes a battery unit 51, a charging/discharging controlling circuit 55 for controlling the charging/discharging of the battery unit 51, and a detecting circuit 56 for detecting the voltage of the battery cell 41 of each battery unit 51 and outputting an abnormal signal to the first and second current controlling elements 52, 53 which control the operation of protective element 42 or short-circuit element 1.

In each battery unit 51, the electrode 47 (A1) of the protective element 42 is connected to the battery cell 41 in series, and the electrode 47 (A2) is connected to the charging/discharging current path of the battery pack 40. Furthermore, in the battery unit 51, the second electrode terminal 5a of the short-circuit element 1 is connected to the open end of the protective element 42 via the protective resistor 54, and the first electrode terminal 4a is connected to the open end of the battery cell 41, such that the protective element 42 and battery cell 41, and the short-circuit element 1 are connected in parallel. Moreover, in the battery unit 51, the heat-generating element electrode 50 (P2) of the protective element 42 is connected to the first current controlling element 52 and the resistor terminal 3a of the short-circuit element 1 is connected to the second current controlling element 53.

The detecting circuit 56 is connected to each battery cell 41 to detect the voltage value of each battery cell 41 and supplies the detected voltage value to a controlling component 59 of the charging/discharging controlling circuit 55. Furthermore, when an over-charging voltage or over-discharging voltage is detected in a battery cell 41, the detecting circuit 56 outputs an abnormal signal to the first and second current controlling elements 52, 53 of the battery unit 51 including the relevant battery cell 41.

When the detection signal output from the detecting circuit 56 indicates a voltage exceeding the predetermined threshold value corresponding to over-discharging or over-charging of the battery cell 41, the first and second current controlling elements 52, 53, which are formed, for example, of a field effect transistor (hereinafter referred to as FET) control the protective element 42 and the short-circuit element 1 to interrupt the charging/discharging current path of the battery unit 51 without the switching operation of the third and fourth current controlling elements 57, 58, to short-circuit the switch 20 of the short-circuit element 1 to form a bypass current path which bypasses the relevant battery unit 51.

The battery pack 40 is removably connected to a charging device via an anode terminal 40a and a cathode terminal not shown, and the charging device applies a charging voltage to each battery cell 41. The battery pack 40 charged by the charging device can be connected to a battery-driven electronic appliance via the anode terminal 40a and the cathode terminal and supply electric power to the electronic appliance.

The charging/discharging controlling circuit 55 includes the third and fourth current controlling elements 57, 58 connected to the current path from the battery unit 51 to the charging device in series, and the controlling component 59 for controlling the operation of the current controlling elements 57, 58. The third and fourth current controlling elements 57, 58 are formed, for example, of FET and the controlling component 59 controls the gate voltage to switch the current path of the battery unit 51 between conducting state and interrupted state. The controlling component 59 is powered by the charging device and, in accordance with the detection signal from the detecting circuit 56, controls the operation of the current controlling elements 57, 58 to interrupt the current path when over-discharging or over-charging occurs in the battery unit 51.

In normal operation of the battery pack 40, the switch 20 of the short-circuit element 1 is not short-circuited and the current E flows through the protective element 42 and the battery cell 41, as shown in FIG. 14 (B).

On the other hand, if an abnormal voltage is detected from the battery cell 41 of the battery pack 40, the detecting circuit 56 outputs an abnormal signal to the first current controlling element 52 and the heat-generating resistor 46 of the protective element 42 generates heat. As shown in FIG. 14 (C), the heat-generating resistor 46 of the protective element 42 heats and melts the meltable conductor 49 to interrupt the connection between the electrodes 47 (A1) and 47 (A2). This can bypass the relevant battery unit 51 having the abnormal battery cell 41 from the charging/discharging current path of the battery pack 40. It should be noted that the blowout of the meltable conductor 49 interrupts the current supplied to the heat-generating resistor 46.

Next, the detecting circuit 56 of the battery pack 40 also outputs an abnormal signal to the second current controlling element 53 of the relevant battery unit 51 such that the heat-generating resistor 3 of the short-circuit element 1 also generates heat. As shown in FIG. 14 (D), the heat-generating resistor 3 of the short-circuit element 1 heats and melts the first and second meltable conductors 8, 9 and the meltable conductor gathers on the first and second electrodes 4, 5 such that the first electrode terminal 4a and the second electrode terminal 5a of the switch 20 are short-circuited. Consequently, the short-circuit element 1 can form a bypass current path which bypasses the relevant battery unit 51. It should be noted that the blowout of the first and second meltable conductors 8, 9 interrupts the current supplied to the heat-generating resistor 3.

It should be noted that setting the resistance of the protective resistor 54 to a value approximately the same as the internal resistance of the battery cell 41 can enable a bypass current having approximately the same as normal operating capacity.

In this battery pack 40, even if an abnormality occurs in one of the battery units 51, a bypass current path bypassing the damaged battery unit 51 can be formed to retain the charging/discharging function by the remaining normal battery units 51.

Those skilled in the art will appreciate that the protective element according to the present invention is not limited to usage in battery packs of lithium ion secondary batteries but may be applied to any other application requiring interruption and bypassing of a current path by an electric signal. Furthermore, the operational conditions of the first and second current controlling elements 52, 53 or the third and fourth current controlling elements 57, 58 are not limited to the voltage abnormality of the battery cell 41 but include any other detectable accident such as abnormal peripheral temperature increase and submersion in water, among others.

Short-Circuit Element (Incorporating Protective Resistor)

A protective resistor may be incorporated into the short-circuit element in advance. In the description below, the same components as short-circuit element 1, protective element 42, LED illumination apparatus 30 and battery pack 40 will be represented by the same reference numbers, and detailed descriptions thereof will not be repeated.

Figure 17:
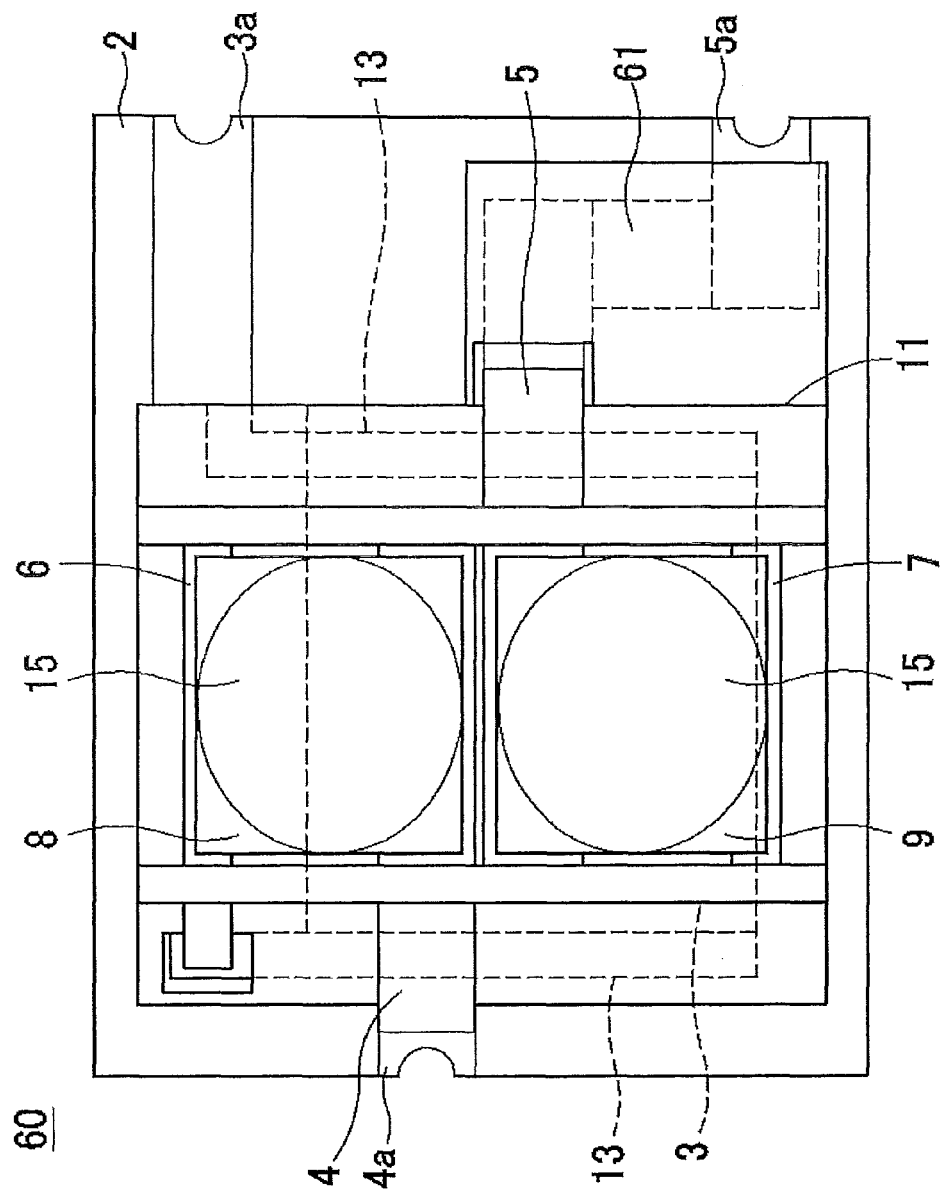
FIG. 17 is a plan view of a short-circuit element incorporating a protective resistor.

FIG. 17 is a plan view of a short-circuit element 60 in which a protective resistor 61 is formed on the insulating substrate 2. In addition to the constitution of the above-described short-circuit element 1, in the short-circuit element 60, the protective resistor 61 is connected to the second electrode 5, and a second electrode terminal 5a is formed on this protective resistor 61. The protective resistor 61 can use the same material and be simultaneously formed with the same process as the heat-generating resistor 3.

In the cases that the internal resistance of an electronic appliance or the battery pack 40 is fixed and known, the short-circuit element 60 incorporating the protective resistor 61 in advance can be used to simplify processes such as mounting.

Figure 18:
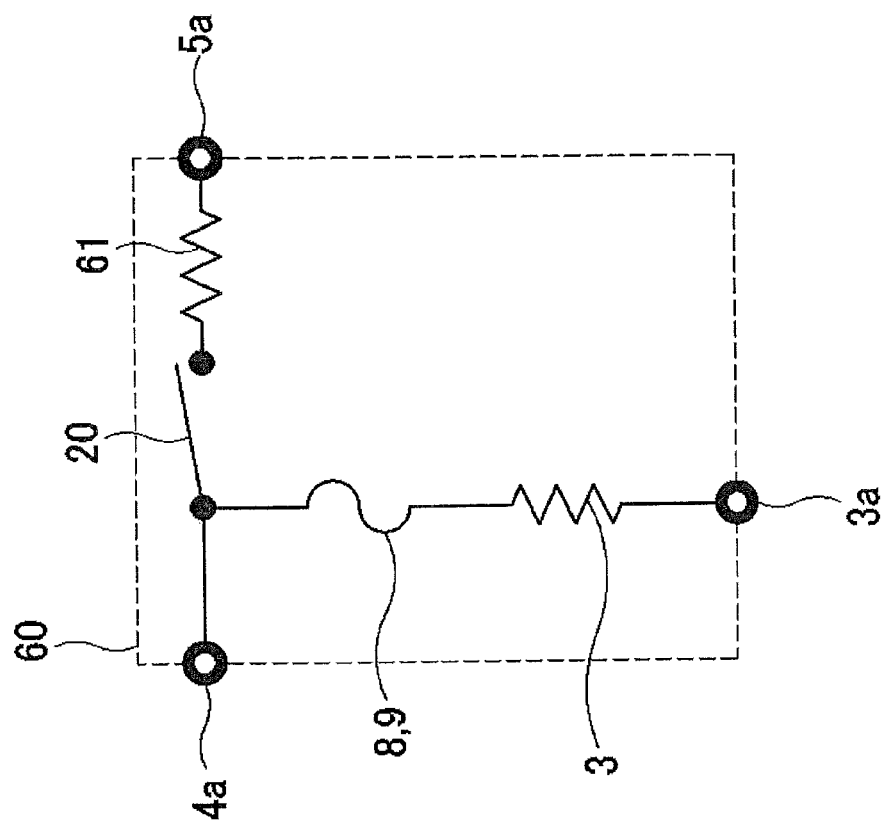
FIG. 18 is a circuit diagram a short-circuit element incorporating a protective resistor.

FIG. 18 shows a circuit arrangement of the short-circuit element 60. In this circuit arrangement of the short-circuit element 60, when the switch 20 is short-circuited, the first electrode terminal 4a and the second electrode terminal 5a are connected via the protective resistor 61. That is, the circuit arrangement of the short-circuit element 60 includes the fuses 8, 9, the heat-generating resistor 3 connected to one end of the fuses 8, 9, the switch 20 connected to the other end of the fuses 8, 9 to which the heat-generating resistor 3 is not connected, and the protective resistor 61 connected to at least one terminal of the switch 20, wherein the switch 20 is short-circuited in conjunction with melting of the fuses 8, 9.

LED Compensation Circuit (Incorporating Protective Resistor)

Figure 19:
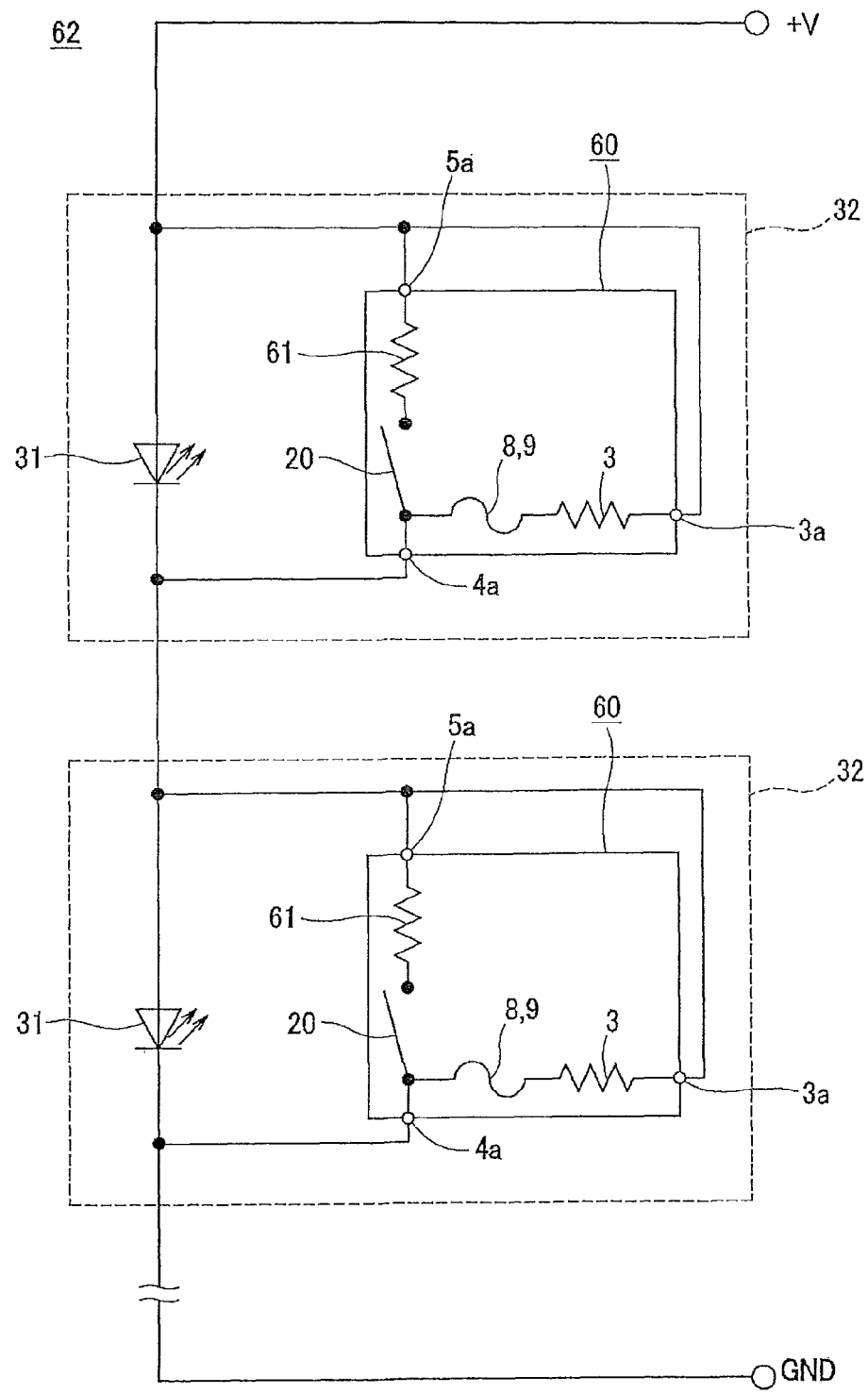
FIG. 19 is a circuit diagram of an LED illumination apparatus using a short-circuit element incorporating a protective resistor.

FIG. 19 shows a circuit arrangement of an LED illumination apparatus 62 incorporating the short-circuit element 60. The circuit arrangement of the LED illumination apparatus 62 is the same as the above-described LED illumination apparatus 30 except that the short-circuit element 1 is replaced by the short-circuit element 60. That is, the circuit arrangement of the LED illumination apparatus 62 includes the above-described short-circuit element 60 and the light emitting diode 31, wherein the terminal 4a connected to the switch 20 and the fuses 8, 9 and the open terminal 5a of the protective resistor 61 are connected to the light emitting diode 31 in parallel, the heat-generating resistor 3 is connected to the protective resistor 61, and in an abnormal situation of the light emitting diode 31, the fuses 8, 9 melt to close the switch 20 so as to form a bypass current path.

In this circuit arrangement of the LED illumination apparatus 62, the resistance of the protective resistor 61 of the short-circuit element 60 is almost the same as the internal resistance of the light emitting diode 31 of each LED unit 32.

In this LED illumination apparatus 62, even if an abnormality occurs in one of the light emitting diodes 31, a bypass current path bypassing the damaged light emitting diode 31 can be formed to retain the illumination function by the remaining normal light emitting diodes 31. In this situation, since the resistance of the protective resistor 34 of the LED illumination apparatus 62 is almost the same as the internal resistance of the light emitting diode 31, the current flowing through the bypass current path will be almost the same as the normal operating current.

Battery Compensation Circuit (Incorporating Protective Resistor)

Figure 20:
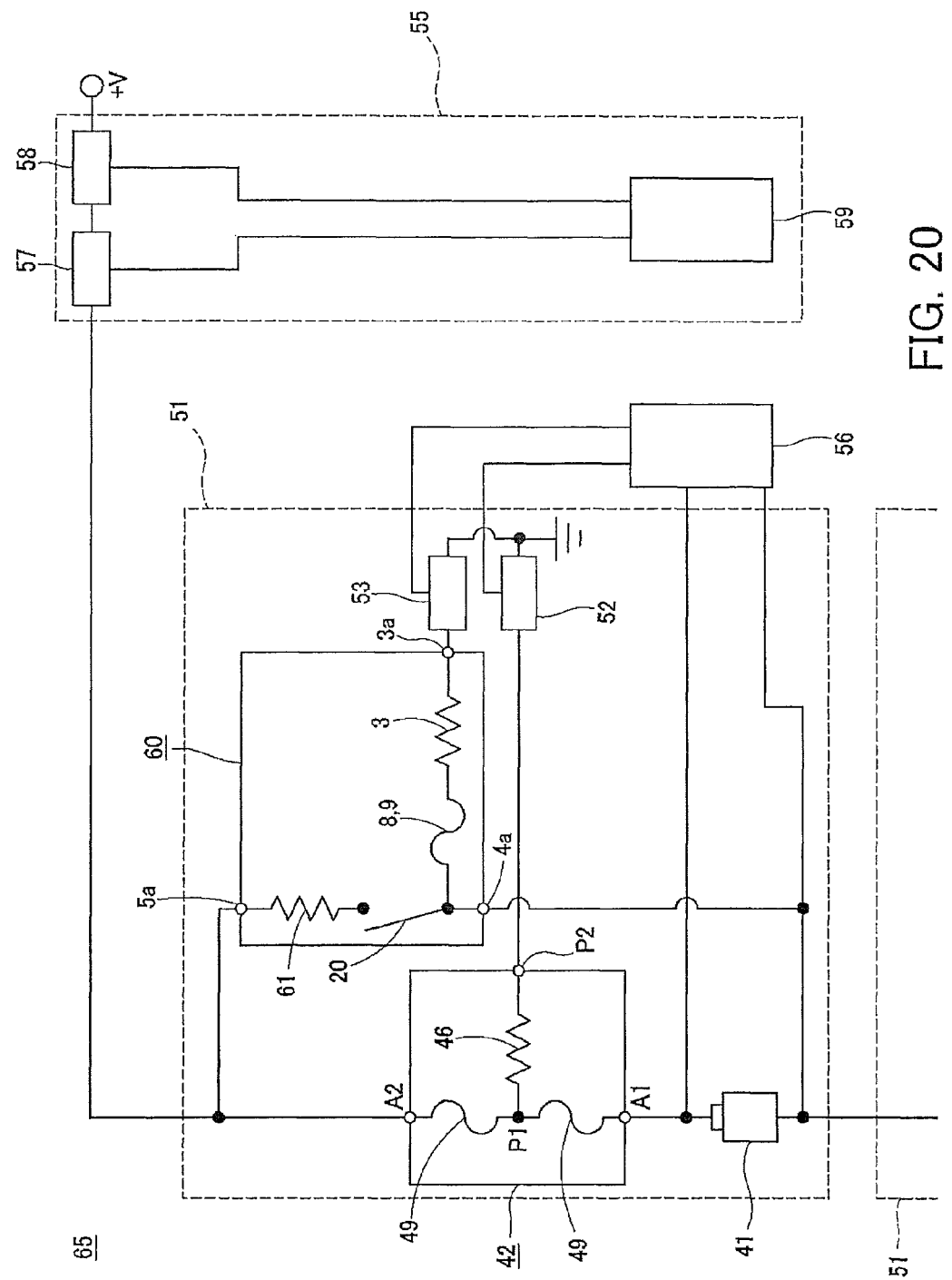
FIG. 20 is a circuit diagram of a battery pack using a short-circuit element incorporating a protective resistor.

FIG. 20 shows a circuit arrangement of a battery pack 65 incorporating the short-circuit element 60. The circuit arrangement of the battery pack 65 is the same as the above-described battery pack 40 except that the short-circuit element 1 is replaced by the short-circuit element 60. The circuit arrangement of the battery pack 65 includes the above-described short-circuit element 60, the battery cell 41, the protective element 42 connected in a current path of the battery cell 41, which disconnects the electrical connection to the battery cell 41 with an electric signal, the detecting circuit 56 which detects an abnormality of the battery cell 41 and outputs an abnormal signal, and first and second current controlling elements 52, 53 which operate in accordance with the abnormal signal from the detecting circuit 56, wherein both terminals of the battery cell 41 and the protective element 42 are connected to the terminal 4a of the switch 20 connected to the fuses 8, 9 and the open terminal 5a of the protective resistor 61 in parallel, the resistor terminal 3a of the heat-generating resistor 3 and the input terminal P2 for the electric signal of the protective element 42 are connected to the first and second current controlling elements 52, 53, and in an abnormal situation of the battery cell 41, the first and second current controlling elements 52, 53 operate in accordance with an abnormal signal from the detecting circuit 56, to disconnect the current path of the battery cell 41 with protective element 42 and to short-circuit the switch 20 in conjunction with melting of the fuses 8, 9 to form a bypass current path. In this circuit arrangement of the battery pack 65, the resistance of the protective resistor 61 of the short-circuit element 60 provided in each battery unit 51 is almost the same as the internal resistance of the battery cell 41 of the relevant battery unit 51.

In this battery pack 65, even if an abnormality occurs in one of the battery units 51, a bypass current path bypassing the damaged battery unit 51 can be formed to retain the charging/discharging function by the remaining normal battery units 51. In this situation, since the resistance of the protective resistor 61 of the battery pack 65 is almost the same as the internal resistance of the battery cell 41, the current flowing through the bypass current path will be almost the same as the normal operating current.

Similarly to the above-described short-circuit element 25, in the short-circuit element 60, other than forming the external terminal 12 on the back surface of the insulating substrate 2 and connecting the external terminal 12 to the first electrode terminal 4a and the second electrode terminal 5a via a through hole, the second external connecting electrode 23 continuous with the second electrode 5, and the second external connecting terminal 24 may be formed on the surface of the insulating substrate 2 to which the first and second electrodes 4, 5 are formed, via the first external connecting electrode 21 continuous with the first electrode 4, the first external connecting terminal 22 and the protective resistor 61.

REFERENCE SIGNS LIST 1 short-circuit element, 2 insulating substrate, 3 heat-generating resistor, 3a resistor terminal, 3b resistor connecting terminal, 4 first electrode, 4a first electrode terminal, 5 second electrode, 5a second electrode terminal, 6 third electrode, 7 fourth electrode, 8 first meltable conductor, 9 second meltable conductor, 10 covering member, 11 insulating layer, 12 external terminal, 13 heat-generating element extracting electrode, 15 flux, 18 covering member electrode, 20 switch, 21 first external connecting electrode, 22 first external connecting terminal, 23 second external connecting electrode, 24 second external connecting terminal, 25 short-circuit element, 30 LED illumination apparatus, 31 light emitting diode, 32 LED unit, 34 protective resistor, 40 battery pack, 41 battery cell, 42 protective element, 44 insulating substrate, 45 insulating member, 46 heat-generating resistor, 47 electrode, 48 heat-generating element extracting electrode, 49 meltable conductor, 50 heat-generating element electrode, 51 battery unit, 52 first current controlling element, 53 second current controlling element, 54 protective resistor, 55 charging/discharging controlling circuit, 56 detecting circuit, 57 third current controlling element, 58 fourth current controlling element, 59 controlling component, 60 short-circuit element, 61 protective resistor, 62 LED illumination apparatus, 65 battery pack.

The invention claimed is:

1. A short-circuit element comprising:
an insulating substrate;
a heat-generating resistor arranged on the insulating substrate;
a first and a second electrodes arranged adjacently to each other on the insulating substrate;
a third electrode arranged adjacently to the first electrode on the insulating substrate and electrically connected to the heat-generating resistor; and
a first meltable conductor arranged between the first and third electrodes to constitute a current path capable of being blown by a heat generated by the heat-generating resistor,
wherein the first meltable conductor is melted by the heat from the heat-generating resistor and gathers on the first and second electrodes to short-circuit the first and second electrodes.

2. The short-circuit element according to claim 1 further comprising a second meltable conductor arranged on the second electrode,
wherein the first and second meltable conductors are melted by the heat from the heat-generating resistor and gather on the first and second electrodes to short-circuit the first and second electrodes.

3. The short-circuit element according to claim 2,
wherein the second meltable conductor is narrower than the first meltable conductor.

4. The short-circuit element according to claim 2 further comprising an insulating layer laminated on the insulating substrate,
wherein the first to third electrodes are arranged on the insulating layer, and
wherein the heat-generating resistor is disposed within the insulating layer or between the insulating layer and the insulating substrate.

5. The short-circuit element according to claim 2, wherein the heat-generating resistor is disposed within the insulating substrate.

6. The short-circuit element according to claim 2, wherein the heat-generating resistor is disposed on a surface of the insulating substrate opposite to an electrode-forming surface.

7. The short-circuit element according to claim 2, wherein the heat-generating resistor is disposed on an electrode-forming surface of the insulating substrate.

8. The short-circuit element according to claim 2 further comprising:
a second meltable conductor arranged on the second electrode,
wherein the heat-generating resistor overlaps the first meltable conductor and the second meltable conductor, and the overlap area of the second meltable conductor is larger than that of the first meltable conductor.

9. The short-circuit element according to claim 2, wherein surfaces of the first electrode and the second electrode are coated with one of Ni/Au plating, Ni/Pd plating and Ni/Pd/Au plating.

10. The short-circuit element according to claim 2 further comprising:
a fourth electrode arranged adjacently to the second electrode on the insulating substrate; and
a second meltable conductor arranged between the second and fourth electrodes to constitute a current path capable of being blown by a heat generated by the heat-generating resistor,
wherein the first electrode has an area wider than that of the third electrode, and the second electrode has an area wider than that of the fourth electrode.

11. The short-circuit element according to claim 2 further comprising:
a covering member arranged on the insulating substrate for internal protection; and
a covering member electrode arranged on an inner surface of the covering member,
wherein the covering member electrode is arranged at a position which overlaps the first electrode and the second electrode.

12. The short-circuit element according to claim 2 further comprising a protective resistor arranged on the insulating substrate and connected to one of the first electrode and the second electrode.

13. The short-circuit element according to claim 2 further comprising:
a second meltable conductor arranged on the second electrode,
wherein the first and second meltable conductors are a Pb free solder consisting essentially of Sn.

14. The short-circuit element according to claim 2 further comprising:
a second meltable conductor arranged on the second electrode,
wherein the first and second meltable conductors contain a low melting point metal and a high melting point metal, and
wherein the low melting point metal is melted by a heat generated by the heat-generating resistor and erodes the high melting point metal.

15. The short-circuit element according to claim 14,
wherein the low melting point metal is a solder, and
wherein the high melting point metal is Ag, Cu or an alloy consisting essentially of Ag or Cu.

16. The short-circuit element according to claim 14, wherein the first and second meltable conductors have a coated structure in which the low melting point metal constitutes an inner layer and the high melting point metal constitutes an outer layer.

17. The short-circuit element according to claim 14, wherein the first and second meltable conductors have a coated structure in which the high melting point metal constitutes an inner layer and the low melting point metal constitutes an outer layer.

18. The short-circuit element according to claim 14, wherein the first and second meltable conductors have a laminated structure in which the low melting point metal and the high melting point metal are laminated.

19. The short-circuit element according to claim 14, wherein the first and second meltable conductors have a multi-layered structure having four or more layers in which the low melting point metal and the high melting point metal are alternately laminated.

20. The short-circuit element according to claim 14, wherein the first and second meltable conductors have a stripe-shaped structure in which the high melting point metal partially overlaps a surface of the low melting point metal.

21. The short-circuit element according to claim 14, wherein the first and second meltable conductors are constituted of a high melting point metal having a plurality of openings and a low melting point metal inserted in the openings.

22. The short-circuit element according to claim 14, wherein, in the first and second meltable conductors, the volume of the low melting point metal is larger than that of the high melting point metal.

23. The short-circuit element according to claim 2,
wherein a first external connecting electrode continuous with the first electrode on the same surface as the meltable conductor, one or more first external connecting terminals provided on the first external connecting electrode, a second external connecting electrode continuous with the second electrode, and one or more second external connecting terminals provided on the second external connecting electrode are formed on the insulating substrate, and
wherein a combined resistance of the first external connecting terminal and the second external connecting terminal is lower than a conduction resistance between the first and second external connecting electrodes when the first electrode and the second electrode are short-circuited.

24. The short-circuit element according to claim 23, wherein the external connecting terminal is a metal bump made of a lead-free solder consisting essentially of tin.

25. The short-circuit element according to claim 23, wherein the external connecting terminal is one of a metal bump and a metal post.

26. The short-circuit element according to claim 25, wherein, in the metal bump or metal post, a low melting point metal layer is formed on a high melting point metal surface.

27. The short-circuit element according to claim 26, wherein the high melting point metal consists essentially of copper or silver, and the low melting point metal is a lead-free solder consisting essentially of tin.

28. The short-circuit element according to claim 1 further comprising:
a fourth electrode arranged adjacently to the second electrode on the insulating substrate; and
a second meltable conductor arranged between the second and fourth electrodes to constitute a current path capable of being blown by a heat generated by the heat-generating resistor,
wherein the first and second meltable conductors are melted by the heat from the heat-generating resistor and gather on the first and second electrodes to short-circuit the first and second electrodes.

29. The short-circuit element according to claim 28 further comprising an insulating layer laminated on the insulating substrate,
wherein the first to third electrodes are arranged on the insulating layer, and
wherein the heat-generating resistor is disposed within the insulating layer or between the insulating layer and the insulating substrate.

30. The short-circuit element according to claim 28, wherein the heat-generating resistor is disposed within the insulating substrate.

31. The short-circuit element according to claim 28, wherein the heat-generating resistor is disposed on a surface of the insulating substrate opposite to an electrode-forming surface.

32. The short-circuit element according to claim 28, wherein the heat-generating resistor is disposed on an electrode-forming surface of the insulating substrate.

33. The short-circuit element according to claim 28 further comprising:
a second meltable conductor arranged on the second electrode,
wherein the heat-generating resistor overlaps the first meltable conductor and the second meltable conductor, and the overlap area of the second meltable conductor is larger than that of the first meltable conductor.

34. The short-circuit element according to claim 28, wherein the second meltable conductor is narrower than the first meltable conductor.

35. The short-circuit element according to claim 28, wherein surfaces of the first electrode and the second electrode are coated with one of Ni/Au plating, Ni/Pd plating and Ni/Pd/Au plating.

36. The short-circuit element according to claim 28 further comprising:
a fourth electrode arranged adjacently to the second electrode on the insulating substrate; and
a second meltable conductor arranged between the second and fourth electrodes to constitute a current path capable of being blown by a heat generated by the heat-generating resistor,
wherein the first electrode has an area wider than that of the third electrode, and the second electrode has an area wider than that of the fourth electrode.

37. The short-circuit element according to claim 28 further comprising:
a covering member arranged on the insulating substrate for internal protection; and
a covering member electrode arranged on an inner surface of the covering member,
wherein the covering member electrode is arranged at a position which overlaps the first electrode and the second electrode.

38. The short-circuit element according to claim 28 further comprising a protective resistor arranged on the insulating substrate and connected to one of the first electrode and the second electrode.

39. The short-circuit element according to claim 28 further comprising:

a second meltable conductor arranged on the second electrode,
wherein the first and second meltable conductors are a Pb free solder consisting essentially of Sn.

40. The short-circuit element according to claim 28 further comprising:
a second meltable conductor arranged on the second electrode,
wherein the first and second meltable conductors contain a low melting point metal and a high melting point metal, and
wherein the low melting point metal is melted by a heat generated by the heat-generating resistor and erodes the high melting point metal.

41. The short-circuit element according to claim 40,
wherein the low melting point metal is a solder, and
wherein the high melting point metal is Ag, Cu or an alloy consisting essentially of Ag or Cu.

42. The short-circuit element according to claim 40, wherein the first and second meltable conductors have a coated structure in which the low melting point metal constitutes an inner layer and the high melting point metal constitutes an outer layer.

43. The short-circuit element according to claim 40, wherein the first and second meltable conductors have a coated structure in which the high melting point metal constitutes an inner layer and the low melting point metal constitutes an outer layer.

44. The short-circuit element according to claim 40, wherein the first and second meltable conductors have a laminated structure in which the low melting point metal and the high melting point metal are laminated.

45. The short-circuit element according to claim 40, wherein the first and second meltable conductors have a multi-layered structure having four or more layers in which the low melting point metal and the high melting point metal are alternately laminated.

46. The short-circuit element according to claim 40, wherein the first and second meltable conductors have a stripe-shaped structure in which the high melting point metal partially overlaps a surface of the low melting point metal.

47. The short-circuit element according to claim 40, wherein the first and second meltable conductors are constituted of a high melting point metal having a plurality of openings and a low melting point metal inserted in the openings.

48. The short-circuit element according to claim 40, wherein, in the first and second meltable conductors, the volume of the low melting point metal is larger than that of the high melting point metal.

49. The short-circuit element according to claim 28,
wherein a first external connecting electrode continuous with the first electrode on the same surface as the meltable conductor, one or more first external connecting terminals provided on the first external connecting electrode, a second external connecting electrode continuous with the second electrode, and one or more second external connecting terminals provided on the second external connecting electrode are formed on the insulating substrate, and
wherein a combined resistance of the first external connecting terminal and the second external connecting terminal is lower than a conduction resistance between the first and second external connecting electrodes when the first electrode and the second electrode are short-circuited.

50. The short-circuit element according to claim 49, wherein the external connecting terminal is a metal bump made of a lead-free solder consisting essentially of tin.

51. The short-circuit element according to claim 49, wherein the external connecting terminal is one of a metal bump and a metal post.

52. The short-circuit element according to claim 51, wherein, in the metal bump or metal post, a low melting point metal layer is formed on a high melting point metal surface.

53. The short-circuit element according to claim 52, wherein the high melting point metal consists essentially of copper or silver, and the low melting point metal is a lead-free solder consisting essentially of tin.

54. The short-circuit element according to claim 1 further comprising an insulating layer laminated on the insulating substrate,
wherein the first to third electrodes are arranged on the insulating layer, and
wherein the heat-generating resistor is disposed within the insulating layer or between the insulating layer and the insulating substrate.

55. The short-circuit element according to claim 1, wherein the heat-generating resistor is disposed within the insulating substrate.

56. The short-circuit element according to claim 1, wherein the heat-generating resistor is disposed on a surface of the insulating substrate opposite to an electrode-forming surface.

57. The short-circuit element according to claim 1, wherein the heat-generating resistor is disposed on an electrode-forming surface of the insulating substrate.

58. The short-circuit element according to claim 1 further comprising:
a second meltable conductor arranged on the second electrode,
wherein the heat-generating resistor overlaps the first meltable conductor and the second meltable conductor, and the overlap area of the second meltable conductor is larger than that of the first meltable conductor.

59. The short-circuit element according to claim 1, wherein surfaces of the first electrode and the second electrode are coated with one of Ni/Au plating, Ni/Pd plating and Ni/Pd/Au plating.

60. The short-circuit element according to claim 1 further comprising:
a fourth electrode arranged adjacently to the second electrode on the insulating substrate; and
a second meltable conductor arranged between the second and fourth electrodes to constitute a current path capable of being blown by a heat generated by the heat-generating resistor,
wherein the first electrode has an area wider than that of the third electrode, and the second electrode has an area wider than that of the fourth electrode.

61. The short-circuit element according to claim 1 further comprising:
a covering member arranged on the insulating substrate for internal protection; and
a covering member electrode arranged on an inner surface of the covering member,
wherein the covering member electrode is arranged at a position which overlaps the first electrode and the second electrode.

62. The short-circuit element according to claim 1 further comprising a protective resistor arranged on the insulating substrate and connected to one of the first electrode and the second electrode.

63. The short-circuit element according to claim 1 further comprising:
a second meltable conductor arranged on the second electrode,
wherein the first and second meltable conductors are a Pb free solder consisting essentially of Sn.

64. The short-circuit element according to claim 1 further comprising:
a second meltable conductor arranged on the second electrode,
wherein the first and second meltable conductors contain a low melting point metal and a high melting point metal, and
wherein the low melting point metal is melted by a heat generated by the heat-generating resistor and erodes the high melting point metal.

65. The short-circuit element according to claim 64, wherein the low melting point metal is a solder, and
wherein the high melting point metal is Ag, Cu or an alloy consisting essentially of Ag or Cu.

66. The short-circuit element according to claim 64, wherein the first and second meltable conductors have a coated structure in which the low melting point metal constitutes an inner layer and the high melting point metal constitutes an outer layer.

67. The short-circuit element according to claim 64, wherein the first and second meltable conductors have a coated structure in which the high melting point metal constitutes an inner layer and the low melting point metal constitutes an outer layer.

68. The short-circuit element according to claim 64, wherein the first and second meltable conductors have a laminated structure in which the low melting point metal and the high melting point metal are laminated.

69. The short-circuit element according to claim 64, wherein the first and second meltable conductors have a multi-layered structure having four or more layers in which the low melting point metal and the high melting point metal are alternately laminated.

70. The short-circuit element according to claim 64, wherein the first and second meltable conductors have a stripe-shaped structure in which the high melting point metal partially overlaps a surface of the low melting point metal.

71. The short-circuit element according to claim 64, wherein the first and second meltable conductors are constituted of a high melting point metal having a plurality of openings and a low melting point metal inserted in the openings.

72. The short-circuit element according to claim 64, wherein, in the first and second meltable conductors, the volume of the low melting point metal is larger than that of the high melting point metal.

73. The short-circuit element according to claim 1,
wherein a first external connecting electrode continuous with the first electrode on the same surface as the meltable conductor, one or more first external connecting terminals provided on the first external connecting electrode, a second external connecting electrode continuous with the second electrode, and one or more second external connecting terminals provided on the second external connecting electrode are formed on the insulating substrate, and
wherein a combined resistance of the first external connecting terminal and the second external connecting terminal is lower than a conduction resistance between the first and second external connecting electrodes when the first electrode and the second electrode are short-circuited.

74. The short-circuit element according to claim 73, wherein the external connecting terminal is a metal bump made of a lead-free solder consisting essentially of tin.

75. The short-circuit element according to claim 73, wherein the external connecting terminal is one of a metal bump and a metal post.

76. The short-circuit element according to claim 75, wherein, in the metal bump or metal post, a low melting point metal layer is formed on a high melting point metal surface.

77. The short-circuit element according to claim 76, wherein the high melting point metal consists essentially of copper or silver, and the low melting point metal is a lead-free solder consisting essentially of tin.

78. A short-circuit element circuit comprising:
a fuse;
a heat-generating resistor connected to one terminal of the fuse; and
a switch connected to another terminal of the fuse to which the heat-generating resistor is not connected,
wherein the switch is short-circuited in conjunction with blowout of the fuse.

79. A compensation circuit comprising:
a short-circuit element having a fuse, a heat-generating resistor connected to one terminal of the fuse, and a switch connected to another terminal of the fuse to which the heat-generating resistor is not connected, the switch being short-circuited in conjunction with blowout of the fuse; and
an electronic component,
wherein both terminals of the switch are connected to the electronic component in parallel,
wherein an open terminal of the heat-generating resistor is connected to the terminal of the switch to which the fuse is not connected, and
wherein, in an abnormal situation of the electronic component, the fuse melts to short-circuit the switch so as to form a bypass current path bypassing the electronic component.

80. The compensation circuit according to claim 79, wherein the electronic component is a light emitting diode which is electrically disconnected in the case of an abnormal situation.

81. The compensation circuit according to claim 80, wherein a protective resistor having a resistance corresponding to an internal resistance of the electronic component is connected in the bypass current path.

82. The compensation circuit according to claim 79, wherein a protective resistor having a resistance corresponding to an internal resistance of the electronic component is connected in the bypass current path.

83. A compensation circuit comprising:
a short-circuit element having a fuse, a heat-generating resistor connected to one terminal of the fuse, and a switch connected to another terminal of the fuse to which the heat-generating resistor is not connected, the switch being short-circuited in conjunction with melting of the fuse; and
an electronic component;

a protective element connected in a current path of the electronic component which interrupts current flowing to the electronic component in the case of an electric signal;
a protective component which detects an abnormality of the electronic component and outputs an abnormal signal; and
a controlling element which operates in accordance with the abnormal signal from the protective component,
wherein both terminals of the electronic component and the protective element are connected to both terminals of the switch in parallel,
wherein an open terminal of the heat-generating resistor and an input terminal for the electric signal of the controlling element are connected to the protective element, and
wherein, in an abnormal situation of the electronic component, the controlling element operates in accordance with an abnormal signal from the protective component to disconnect the current path of the electronic component with the protective element and to short-circuit the switch in conjunction with melting of the fuse to form a bypass current path.

84. The compensation circuit according to claim 83, wherein the electronic component is a battery cell having a risk of electrical short-circuit or thermal runaway occurring in an abnormal situation.

85. The compensation circuit according to claim 83, wherein a protective resistor having a resistance corresponding to an internal resistance of the electronic component is connected in the bypass current path.

86. The compensation circuit according to claim 85,
wherein the controlling element comprises a first controlling element connected to an open terminal of the heat-generating resistor and a second controlling element connected to an electric signal input terminal of the protective element, and
wherein the protective component, and the first and second controlling element are controlled such that the protective element disconnects the current path and then the short-circuit element forms a bypass current path.

87. The compensation circuit according to claim 83,
wherein the controlling element comprises a first controlling element connected to an open terminal of the heat-generating resistor and a second controlling element connected to an electric signal input terminal of the protective element, and
wherein the protective component, and the first and second controlling element are controlled such that the protective element disconnects the current path and then the short-circuit element forms a bypass current path.

88. A short-circuit element circuit comprising:
a fuse;
a heat-generating resistor connected to one terminal of the fuse;
a switch connected to another terminal of the fuse to which the heat-generating resistor is not connected; and
a protective resistor connected to at least one terminal of the switch,
wherein the switch is short-circuited in conjunction with blowout of the fuse.

89. A compensation circuit comprising:
a short-circuit element having a fuse, a heat-generating resistor connected to one terminal of the fuse, a switch connected to another terminal of the fuse to which the heat-generating resistor is not connected, and a protective resistor connected to at least one terminal of the switch to which the fuse is not connected, the switch being short-circuited in conjunction with melting of the fuse; and
an electronic component,
wherein the terminal connected to the switch and the fuse and an open terminal of the protective resistor, are connected to the electronic component in parallel,
wherein the heat-generating resistor is connected to the protective resistor, and
wherein, in an abnormal situation of the electronic component, the fuse melts to turn on the switch so as to form a bypass current path.

90. The compensation circuit according to claim 89, wherein the electronic component is a light emitting diode which is electrically disconnected in the case of an abnormal situation.

91. A compensation circuit comprising:
a short-circuit element having a fuse, a heat-generating resistor connected to one terminal of the fuse, a switch connected to another terminal of the fuse to which the heat-generating resistor is not connected, and a protective resistor connected to at least one terminal of the switch to which the fuse is not connected, the switch being short-circuited in conjunction with melting of the fuse;
an electronic component,
a protective element connected in a current path of the electronic component, which disconnects the electrical connection to the electronic component in the case of an electronic signal;
a protective component which detects an abnormality of the electronic component and outputs an abnormal signal; and
a controlling element which operates in accordance with the abnormal signal from the protective component,
wherein both terminals of the electronic component and the protective element are connected to the terminal of the switch connected to the fuse and the protective resistor in parallel,
wherein an open terminal of the heat-generating resistor and an input terminal for the electric signal of the controlling element are connected to the protective element, and
wherein, in an abnormal situation of the electronic component, the controlling element operates in accordance with an abnormal signal from the protective component to disconnect the current path of the electronic component with the protective element and to short-circuit the switch in conjunction with melting of the fuse to form a bypass current path.

92. The compensation circuit according to claim 91, wherein the electronic component is a battery cell a battery cell having a risk of electrical short-circuit or thermal runaway occurring in an abnormal situation.

93. The compensation circuit according to claim 92,
wherein the controlling element comprises a first controlling element connected to an open terminal of the heat-generating resistor and a second controlling element connected to an electric signal input terminal of the protective element, and
wherein the protective component, and the first and second controlling elements are controlled such that the protective element disconnects the current path and then the short-circuit element forms a bypass current path.

94. The compensation circuit according to claim 91,
wherein the controlling element comprises a first controlling element connected to an open terminal of the heat-generating resistor and a second controlling element connected to an electric signal input terminal of the protective element, and
wherein the protective component, and the first and second controlling elements are controlled such that the protective element disconnects the current path and then the short-circuit element forms a bypass current path.

95. A mounting member in which a short-circuit element is mounted onto a mounting target, the short-circuit element comprising:
   an insulating substrate;
   a heat-generating resistor arranged on the insulating substrate;
   a first and a second electrodes arranged adjacently to each other on the insulating substrate;
   a third electrode arranged adjacently to the first electrode on the insulating substrate and electrically connected to the heat-generating resistor;
   a first meltable conductor arranged between the first and third electrodes to constitute a current path capable of being blown by a heat generated by the heat-generating resistor; and
   a first external connecting electrode continuous with the first electrode formed on the same surface as the first and second electrodes, and a second external connecting electrode continuous with the second electrode,
   wherein the first electrode is connected to the mounting target via the first external connecting terminal connected to the first external connecting electrode, and the second electrode is connected to the mounting target via the second external connecting terminal connected to the second external connecting electrode, and
   wherein a combined resistance of the first external connecting terminal and the second external connecting terminal is lower than a conduction resistance between the first and second external connecting electrodes when the first meltable conductor is melted by the heat from the heat-generating resistor and gather on the first and second electrodes to short-circuit the first and second electrodes.

\* \* \* \* \*